US010158391B2

(12) United States Patent
Altman

(10) Patent No.: US 10,158,391 B2
(45) Date of Patent: Dec. 18, 2018

(54) WIRELESS AREA NETWORK ENABLED MOBILE DEVICE ACCESSORY

(71) Applicant: QUALCOMM Incorporated, San Diego, CA (US)

(72) Inventor: Steven R. Altman, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 14/053,441

(22) Filed: Oct. 14, 2013

(65) Prior Publication Data

US 2014/0106677 A1  Apr. 17, 2014

Related U.S. Application Data

(60) Provisional application No. 61/714,011, filed on Oct. 15, 2012.

(51) Int. Cl.
*H04B 7/00* (2006.01)
*H04B 1/3827* (2015.01)
(Continued)

(52) U.S. Cl.
CPC .......... *H04B 1/3827* (2013.01); *H04B 1/385* (2013.01); *H04M 1/7253* (2013.01); *H04W 4/80* (2018.02);
(Continued)

(58) Field of Classification Search
CPC ................. H04B 1/3827; H04B 1/385; H04B 2001/3885; H04B 2001/3861; H04M 2250/02; H04W 4/008
(Continued)

(56) References Cited

U.S. PATENT DOCUMENTS 6,995,668 B2  2/2006 Junqua
8,184,983 B1  5/2012 Ho et al.
(Continued)

FOREIGN PATENT DOCUMENTS

CN  101124789 A  2/2008
JP  2003533318 A  11/2003
(Continued)

OTHER PUBLICATIONS

International Search Report and Written Opinion—PCT/US2013/065103—ISA/EPO—dated Jan. 24, 2014.

*Primary Examiner* — Raj Chakraborty
(74) *Attorney, Agent, or Firm* — The Marbury Law Group/Qualcomm

(57) ABSTRACT

A wearable wireless portable device ("WWPD") includes cellular/WAN communications circuitry for establishing a direct connection to a telecommunication network and a low-power short range radio for establishing an indirect connection to the telecommunication network via the communications circuitry of the more feature-rich mobile device. The WWPD may be configured to deactivate its cellular/WAN communications circuitry (and other resource such as GPS) to communicate with a more feature-rich mobile device (e.g., a smartphone) via low-power short range communication technologies when it is in close proximity to the mobile device, and activate its cellular/WAN circuitry to provide cellular and/or network connectivity when it is not in close proximity to the mobile device. The WWPD does not require the bulky battery systems, which enables the WWPD to be packaged into a small and lightweight device, such as a wrist watch or pendant and enables longer battery life for the battery of the WWPD.

52 Claims, 16 Drawing Sheets

(51) Int. Cl.
*H04M 1/725* (2006.01)
*H04W 12/06* (2009.01)
*H04W 4/80* (2018.01)
*G08B 25/00* (2006.01)
*G08B 25/01* (2006.01)

(52) U.S. Cl.
CPC .......... *H04W 12/06* (2013.01); *G08B 25/004* (2013.01); *G08B 25/016* (2013.01); *H04B 2001/3855* (2013.01); *H04B 2001/3861* (2013.01); *H04M 2250/02* (2013.01); *H04M 2250/06* (2013.01); *H04M 2250/12* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/23* (2018.01); *Y02D 70/26* (2018.01); *Y02D 70/40* (2018.01)

(58) Field of Classification Search
USPC .................................... 455/41.1, 41.2
See application file for complete search history.

(56) References Cited

U.S. PATENT DOCUMENTS

| | | |
|---|---|---|
| 8,260,384 B2 | 9/2012 | Wulff et al. |
| 2004/0102931 A1* | 5/2004 | Ellis .................. A61B 5/1038 702/188 |
| 2006/0087993 A1 | 4/2006 | Sengupta et al. |
| 2008/0076972 A1* | 3/2008 | Dorogusker ....... A61B 5/02055 600/300 |
| 2010/0203905 A1* | 8/2010 | Chaubey ............... H04W 68/00 455/458 |
| 2010/0292556 A1* | 11/2010 | Golden ............... A61B 5/7465 600/364 |
| 2012/0170521 A1* | 7/2012 | Vogedes ............... H04W 76/15 370/329 |
| 2012/0253485 A1 | 10/2012 | Weast et al. |
| 2012/0258702 A1 | 10/2012 | Matsuyama |

FOREIGN PATENT DOCUMENTS

| | | |
|---|---|---|
| WO | 0189368 A2 | 11/2001 |
| WO | 2005/104575 A1 | 11/2005 |
| WO | 2011029032 A1 | 3/2011 |

\* cited by examiner

WIRELESS AREA NETWORK ENABLED MOBILE DEVICE ACCESSORY

RELATED APPLICATIONS

This application claims the benefit of priority to U.S. Provisional patent application No. 61/714,011 entitled "Wireless Area Network Enabled Mobile Device Accessory" filed Oct. 15, 2012, the entire contents of which are hereby incorporated by reference for all purposes.

BACKGROUND

Cellular and wireless communication technologies have seen explosive growth over the past several years. Cellular service providers now offer a wide array of features and services that provide their users with unprecedented levels of access to information, resources and communications. To keep pace with these service enhancements, mobile electronic devices (e.g., cellular phones, tablets, laptops, etc.) have become more feature rich, and now commonly include powerful processors, wireless radios, sensors, and many other components for connecting users to friends, work, leisure activities and entertainment. As a result of these improvements, mobile devices (e.g., smart phones, tablets, etc.) are rapidly growing in popularity and use, and quickly becoming a necessary, ever-present, and indispensible tool for navigating modern society.

While mobile devices are becoming indispensible and ever-present in modern life, there are times when it is not convenient for the mobile device user to carry a conventional cellular-capable mobile device, such as when the mobile device user is exercising. Therefore, a lightweight, power efficient, and wearable mobile device (e.g., wrist display, pendant, etc.) configured to provide mobile device users with cellular and network connectivity in the absence of a conventional cellular-capable mobile device will be beneficial to consumers.

SUMMARY

The various embodiments include methods of communicating information between a wearable wireless portable device and a telecommunication network by determining in a processor of the wearable wireless portable device whether a low-power short range communication link can be established to a mobile device, establishing the low-power short range communication link to the mobile device, de-energizing wide area network (WAN) communications circuitry in the wearable wireless portable device, and communicating with the telecommunication network via the low-power short range communication link when the processor determines that the low-power short range communication link can be established. When the processor determines that the low-power short range communication link cannot be established the processor activates the WAN communications circuitry in the wearable wireless portable device and communicates with the telecommunication network via the activated WAN communications circuitry.

In an embodiment, communicating with the telecommunication network via the low-power short range communication link may include generating in the processor, a control message configured to cause the mobile device to establish a network connection to the telecommunication network, sending the control message to the mobile device over the low-power short range communication link, receiving in the processor a response message indicating that the mobile device has established the network connection to the telecommunication network, transmitting data to the mobile device over the low-power short range communication link, and receiving in the processor, information/content sent from the telecommunication network to the mobile device over the network connection. The information/content may be received via the low-power short range communication link.

In a further embodiment, sending the control message to the mobile device over the low-power short range communication link may include sending a control message configured to cause the mobile device to establish the network connection to the telecommunication network. Also transmitting data to the mobile device and receiving content sent from the telecommunication network to the mobile device over the network connection may include accessing the telecommunication network via the network connection of the mobile device by transmitting and receiving data via the low-power short range communication link.

An embodiment method may further include controlling one or more features of the mobile device by the wearable wireless portable device over the low-power short range communication link. Also, an embodiment method may further may include receiving in the wearable wireless portable device an incoming communication of the mobile device via the low-power short range communication link, and generating in the wearable wireless portable device a user notification to inform a user of the incoming communication, which may include displaying a message on an electronic display of the wearable wireless portable device and/or outputting an audible sound or a vibration from the wearable wireless portable device.

In a further embodiment, the method may include registering with a server configured to route communications to and from the mobile device. In an embodiment, sending the control message to the mobile device over the low-power short range communication link may include sending the control message to the server, and receiving the response message indicating that the mobile device has established the network connection to the telecommunication network may include receiving the response message from the server.

In various embodiments, determining in a processor of the wearable wireless portable device whether the low-power short range communication link can be established to the mobile device includes determining whether the low-power short range communication link can be established in a processor included in a wrist display, a bracelet, a belt buckle, a medallion, a pendent, a pen, or a key chain. In an embodiment, the method may include de-energizing/deactivating a resource such as cellular/WAN within the wearable wireless portable device when the processor determines that the low-power short range communication link can be established with the mobile device, thereby allowing that de-engergized/deactivated resource to be handled through/in the mobile device. In a further embodiment, de-energizing/deactivating a resource within the wearable wireless portable device may also include de-energizing/deactivating a global positioning system receiver/functionality in the wearable wireless portable device when the processor determines that the low-power short range communication link can be established, thereby allowing GPS functionality to be handled through/in the mobile device. As used herein throughout, the terms "de-energizing", "deactivating" and "powering-down" (powering down, power-down) are used interchangeably.

Further embodiments include a wearable wireless portable device having various means for performing the functions of the methods discussed above, such as means for determining whether a low-power short range communication link can be established to a mobile device, means for establishing the low-power short range communication link to the mobile device, means for de-energizing/deactivating wide area network (WAN) communications circuitry (e.g., a cellular telephone transceiver) in the wearable wireless portable device and communicating with a telecommunication network in the mobile device via the low-power short range communication link in response to determining that the low-power short range communication link can be established, and means for activating the WAN communications circuitry and communicating with the telecommunication network via the activated WAN communications circuitry in response to determining that the low-power short range communication link cannot be established.

Further embodiments include a wearable wireless portable device that includes a WAN communications circuitry, and a processor coupled to the WAN communications circuitry that is configured with processor-executable instructions to perform operations for accomplishing the functions of the methods discussed above.

Further embodiments include non-transitory computer readable storage medium having stored thereon processor-executable software instructions configured to cause a processor to perform various operations corresponding to the method operations discussed above.

Further embodiments include a communication device capable of mobile operation that includes a first transceiver suitable for wirelessly communicating information directly to a wide area network (WAN), a second transceiver suitable for communicating information indirectly to the WAN via a wireless connection to a second communication device capable of mobile operation and connected wirelessly to the WAN and a processor coupled to the first and second transceivers and configured with processor-executable instructions to perform operations that include selectively powering down duplicate functionality of the communication device in response to determining that a wireless connection, such as a low-power short range communication link, has been established to the second communication device. Powering down duplicate functionality of the communication device may include powering down the first transceiver and/or powering down a position location functionality of the communication device, such as a global positioning system receiver. In a further embodiment, the processor may be configured with processor-executable instructions to perform operations such that selectively powering down duplicate functionality of the communication device includes powering down one or more of a heart rate sensor; a blood pressure sensor; a gyroscope; an accelerometer; a pedometer; a thermometer; and a glucometer.

Further embodiments include a communication device capable of mobile operation that includes means for wirelessly communicating information directly to a wide area network (WAN), means for communicating information indirectly to the WAN via a wireless connection to a second communication device capable of mobile operation and connected wirelessly to the WAN, and means for selectively powering down duplicate functionality of the communication device in response to determining that the wireless connection, such as a low-power short range communication link, has been established to the second communication device. The means for selectively powering down duplicate functionality of the communication device may include means for powering down the means for wirelessly communicating information directly to the WAN, and/or means for powering down a position location functionality of the communication device, such as a global positioning system receiver. In a further embodiment, the means for selectively powering down duplicate functionality of the communication device may include means for powering down one or more of a heart rate sensor, a blood pressure sensor, a gyroscope, an accelerometer, a pedometer, a thermometer, and a glucometer.

Further embodiments include a first device capable of mobile operation, said first device being operable to communicate information, wirelessly, directly to a wide area network (WAN) or indirectly, via a wireless connection to a second device capable of mobile operation and connected wirelessly to said WAN. In an embodiment, the first device is operable to selectively power-down duplicate functionality on said first device likewise found on said second device in connection with a wireless link being established between said first and second devices. In a further embodiment, the duplicate functionality may include a position location functionality of the first or second device.

Further embodiments include a method of operating a wearable wireless portable device that includes establishing a low-power short range communication link to a mobile device having wide area network (WAN) capability, and in response to establishing a low-power short range communication link with the mobile device, de-energizing WAN communications circuitry in the wearable wireless portable device and communicating with a WAN through the mobile device via the low-power short range communication link. In an embodiment the method may further include activating the WAN communications circuitry in the wearable wireless portable device and communicating with the WAN via the activated WAN communications circuitry in the wearable wireless portable device when the low-power short range communication link, between the mobile device and the wearable wireless portable device, is not available.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1A:
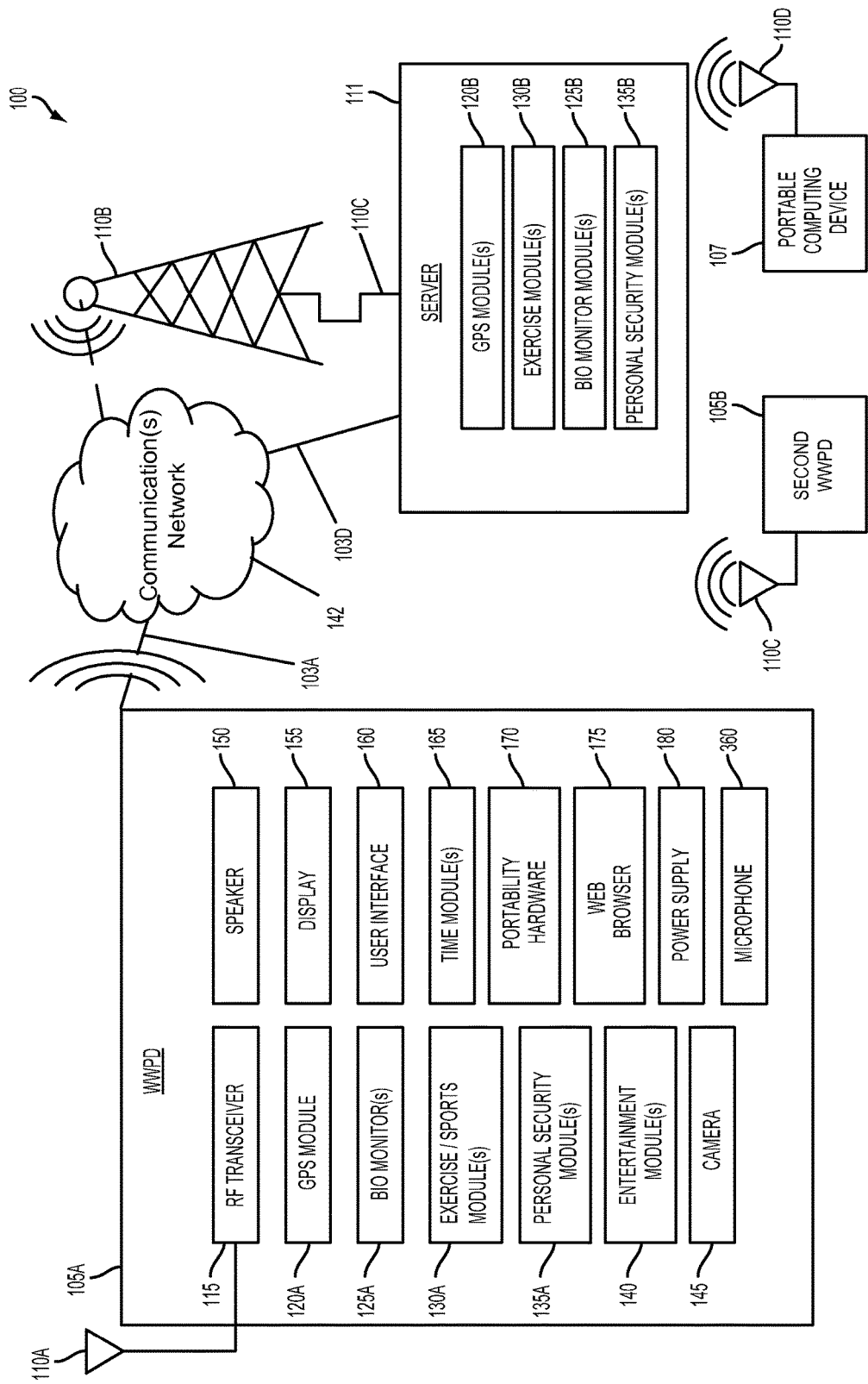
FIG. 1A is a system wide functional block diagram of a wearable wireless portable device coupled to a wireless communications network.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The term "computing device" is used herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet enabled cellular telephones, Global Positioning System (GPS) receivers, wireless gaming controllers, and other similar electronic devices that include a programmable processor and circuitry for wirelessly sending or receiving information.

The terms "mobile device," "wireless device" and "wireless node" are used herein to refer to any electronic device that includes circuitry for wirelessly sending and/or receiving information, and may include any one or all of cellular telephones, personal or mobile multi-media players, watches, wrist displays, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include circuitry for sending and/or receiving wireless communication signals.

The term "wireless-enabled device" is used herein to refer to any electronic device that includes a radio frequency (RF) radio or circuitry for wirelessly sending or receiving information via a short wave wireless technology, such as Wi-Fi and Bluetooth®, and thus may encompass many commercially available mobile devices, medical devices, personal computers, cameras, projectors, and other similar electronic devices. Details of the Wi-Fi standards and technologies are set forth in Institute of Electrical and Electronics Engineers' (IEEE) 802.11 standards, which are herein incorporated by reference for details related to the communication technologies.

The term "Bluetooth®-enabled device" is used herein to refer to any electronic device that includes a radio frequency (RF) radio and a processor or circuitry for implementing the Bluetooth® protocol stack/interface. Bluetooth® is an open standard for short-range radio frequency (RF) communications. Details of the Bluetooth® standards, interfaces, and technology are set forth in Bluetooth® Special interest Group (SIG) Specification of the Bluetooth® System Version 4.0 Jun. 30, 2010, which is herein incorporated by reference in its entirety.

The various embodiments may be implemented using a variety of communication protocols, but are described herein using Bluetooth® and Bluetooth®-related terminology as a convenient example of a communications technology for wirelessly connecting electronic devices located within a relatively short distance of one another (e.g., 100 meters). However, the examples referring to Bluetooth®, and other references to the Bluetooth® herein, are for illustration purposes only, and are not intended to limit the descriptions or the claims to that particular standard. Therefore, the scope of the claims should not be construed as requiring Bluetooth® unless specifically recited in the claims.

As discussed above, mobile devices (e.g., smartphones, etc.) are quickly becoming a necessary and indispensible tool for navigating modern society, yet there are times when it is not convenient for consumers to carry a conventional cellular-capable mobile device (e.g., while exercising, etc.).

The various embodiments provide a lightweight, power efficient, and wearable wireless portable device ("WWPD") configured to communicate with a more conventional and feature-rich mobile device (e.g., smartphone, etc.) via low-power short range communication technologies (e.g., Bluetooth®, WiFi, etc.) when in close proximity to the mobile device, and provide the user access to cellular, telecommunication and/or wide area networks when not in close proximity to the mobile device. The wearable wireless portable device allows the user to continue having cellular/network connectivity when he/she is not carrying a cellular or network-enabled mobile device, but does not require the bulky, complex and/or power hungry circuitry or hardware typically included in conventional mobile devices. The wearable wireless portable device may transition between the different types of cellular and wireless communication technologies seamlessly and without user interaction.

The wearable wireless portable device may be configured to automatically establish wide area network (WAN) connectivity when it is not in close proximity to the mobile device and/or when a low power short-range communication link cannot be established with the mobile device. WAN connectivity may be achieved via a cellular telephone network connection between a cellular transceiver in the wearable wireless portable device to a base state in a cellular telecommunication network.

The wearable wireless portable device may be further configured to enter a low power state, turn off its wide area network (WAN) and/or cellular communications circuitry, and/or automatically establish a low power direct communication link to the mobile device when it is in close proximity to the mobile device. The wearable wireless portable device may also be configured automatically disable or reduce the power consumption of any or all of the resources or components included the device when it is in close proximity to the mobile device and/or when a low power direct communication link is established with the mobile device. Example of device resources or components that may be disabled in such a situation include a Global Positioning System (GPS) receiver, a WAN modem or transceiver, a communication bus, voltage rails, sensors, and processors.

In an embodiment, the wearable wireless portable device may be configured to use the direct communication link to send and receive communication messages to and from a telecommunication network or WAN via the network connectivity of the mobile device. The wearable wireless portable device mobile device may also be configured to send and receive messages to and from the mobile device via the direct communication link.

In an embodiment, the wearable wireless portable device may be configured to register with a server or service that routes the communications to and from the wearable device, and to send/receive communications to and from the server or service.

In various embodiments, the wearable wireless portable device may be a wrist display, badge, tag, bracelet, patch, belt buckle, medallion, pen, key chain, or any other device that may be worn or carried by a user.

As mentioned above, the wearable wireless portable device may be configured to enter a low power state and turn off WAN and cellular communications circuitry when it is in close proximity to the mobile device. The wearable wireless portable device may also be configured to place the one or more processors and/or device resources (e.g., GPS receiver, memory unit, communication bus, etc.) in a low power state when it is in close proximity to the mobile device and/or when a low power direct communication link is established with the mobile device. These features reduce the amount of power consumed by the wearable wireless portable device, extending its battery life and/or reducing the size and weight of its battery. The above mentioned features also enable a wireless service provider to charge consumers less for their services, since a large portion of the wearable wireless portable device's network connectivity and communications may be achieved via the network connectivity of a second device (e.g., the mobile device).

FIG. 1A is an illustration of a system 100 that includes a wearable wireless portable device 105A coupled to a wireless communications network 142. Many of the system elements illustrated in FIG. 1A are coupled via communications links 103 to the wireless communications network 142.

The links 103 illustrated in FIG. 1A may include wired or wireless links. Wireless links include, but are not limited to, radio-frequency ("RF") links, infrared links, acoustic links, and other wireless mediums. The wireless communications network 142 may include a wide area network ("WAN"), a local area network ("LAN"), the Internet, a Public Switched Telephony Network ("PSTN"), a paging network, or a combination thereof. The wireless communications network 142 may be established by broadcast RF transceiver towers 110B. However, one of ordinary skill in the art recognizes that other types of communication devices besides broadcast RF transceiver towers 110B are included within the scope of the invention for establishing the wireless communications network 142. The wearable wireless portable device ("WWPD") 105A is shown to have an RF antenna 110A so that a respective wearable wireless portable device 105A may establish wireless communication links 103 with the wireless communications network 142 via broadcast RF transceiver towers 110B.

Figure 1B:
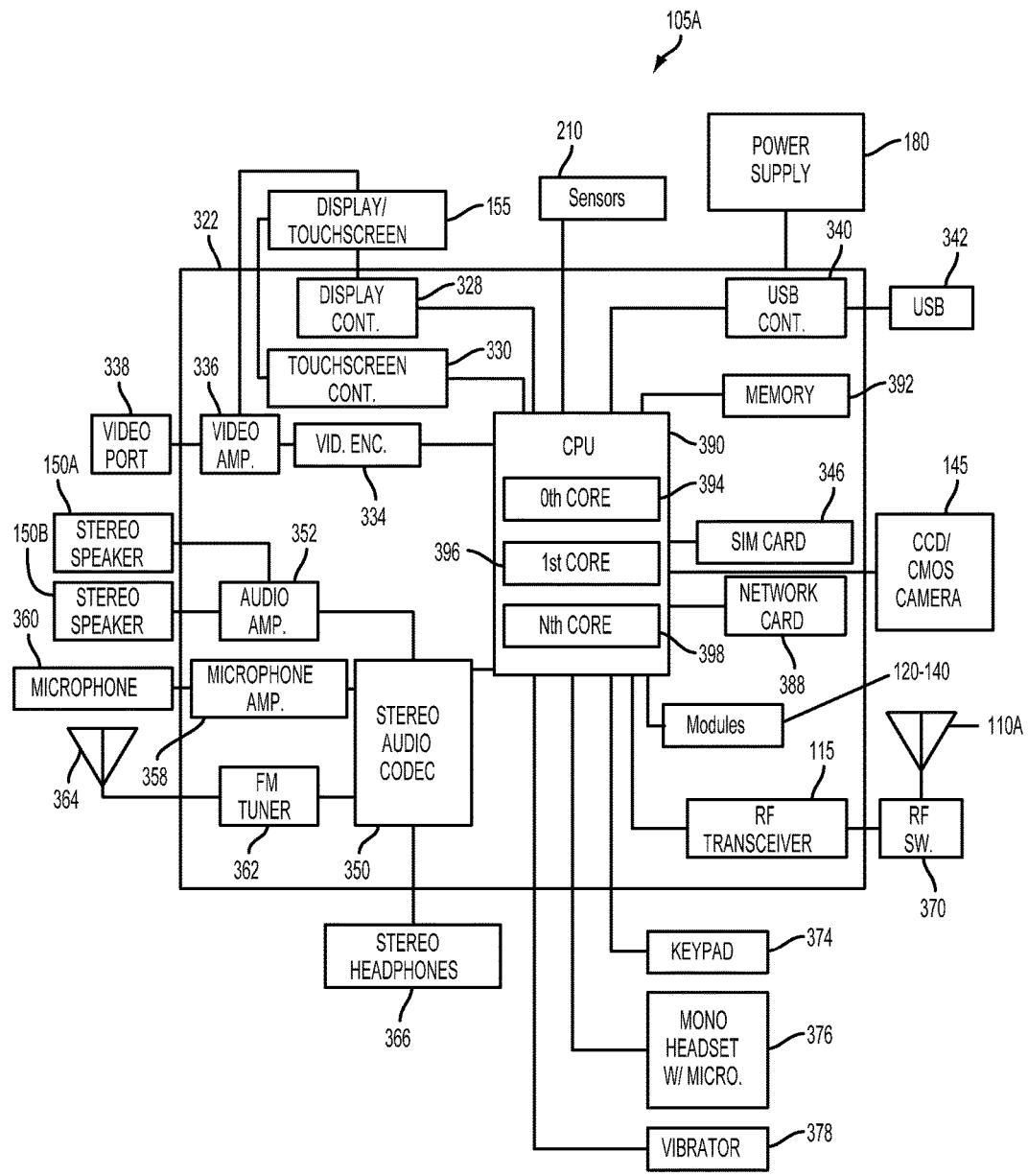
FIG. 1B is a detailed functional block diagram of a second embodiment of a wearable wireless portable device.

The wearable wireless portable device 105A may include a plurality of software and/or hardware components, such as the illustrated radio-frequency ("RF") transceiver 115, global positioning satellite (GPS) module 120A, biological or physiological monitor(s) 125A, exercise or sports activity module 130A, personal security module 135A, entertainment module 140, camera 145, speaker 150, display 155, user interface module 160, time module 165, portability hardware 170, web browser module 175, power supply 180, and microphone 360. The wearable wireless portable device 105A may include a processor or central processing unit ("CPU") 390 as illustrated in FIG. 1B and described below.

The processor/CPU 390 may be configured with processor executable instructions to perform the functions described herein or it may have several dedicated circuits that provide the functions described herein.

The RF transceiver 115 may be coupled to the RF antenna 110A. The RF transceiver 115 may support one or more multiple RF communication types. For example, the RF transceiver 115 may support cellular phone type RF communications. Other communication types include, but are not limited to, fixed wireless, portable communication systems ("PCS"), or satellite communications systems. The RF transceiver 115 may provide for multiple access communications, in accordance with any standard or protocol, such as, for example, code division multiple access ("CDMA"), time division multiple access ("TDMA"), frequency division multiple access ("FDMA"), or Global System for Mobile communications ("GSM"), or any combination thereof.

The RF transceiver 115 in combination with the wireless communications network 142 may also support QChat® service type instantaneous communications. QChat® is a software application developed by Qualcomm Internet Services (QIS), a division of Qualcomm, Inc. and part of the Qualcomm Wireless and Internet group. QChat® provides a reliable method of instant connection and two-way communication between users who may be in different and who are operating within the same type of network architecture. QChat® may include a software application developed for the Binary Runtime Environment for Wireless ("BREW") platform.

"Press-to-Transmit" ("PTT") is a method of conversing on half-duplex communication lines for 3G and 4G networks. QChat® handsets and server software as of this writing allow users of the wearable wireless portable device 105A to connect instantaneously with other QChat® users anywhere in the world with the push of a button. In addition, the QChat® service enables one-to-one (private) and one-to-many (group) calls over the 3G and 4G networks.

As understood by one of ordinary skill in the art, QChat® may use standard Voice over Internet Protocol (VoIP) technologies. Voice information may be sent in digital form over internet protocol ("IP") data networks in discrete packets rather than traditional circuit-switched protocols such those used in the public switched telephone network ("PSTN").

The RF transceiver 115 may also support short messaging system (SMS) functions such as texting. The RF transceiver 115 may allow the operator of the wearable wireless portable device 105A to forward inbound or incoming phone calls to a text to speech engine that may include software and/or hardware which are part of the user interface module 160. Alternatively, the text to speech engine hardware and/or software may be part of a server 111, which may receive phone calls that are forwarded to it by the wearable wireless portable device 105A.

The GPS module 120A may include hardware and/or software that supports the United States Global Positioning System ("GPS") or any other location position system of functionality. Thus, it should be understood that other global navigation satellite systems ("GNSS") are included within the scope of this application, and may also be supported by hardware and/or software executed by the wearable wireless portable device 105A. Other GNSS or Satellite Positioning Systems ("SPS") include, but are not limited to, the Russian GLONASS system, and the European Galileo System. The GPS module 120A may provide an operator of the wearable wireless portable device 105A with a current set of the geographical coordinates for the location of the WWPD 105A. The wearable wireless portable device 105A may also provide maps showing the geographical coordinates on the display 155. The GPS module 120A may also transmit its calculated geographical coordinates using the RF transceiver 115 over the wireless communications network 142 to a remote server 111, a second wearable wireless portable device (WWPD) 105B, and/or a portable computing device 107.

The wearable wireless portable device 105A may include one or more biological or physiological monitor modules 125A. These monitor modules 125A may check and track one or more physiological parameters. Exemplary measured physiological and/or calculated parameters include, but are not limited to: heart rate, calories burned, variability in heart rate, breathing rate, arrhythmia of the heart (if any), general rhythm and functioning of the heart, blood pressure, abnormal body movements (convulsions), body position, general body movements, body temperature, presence and quantity of sweat, oxygenation, and glucose levels in the blood. The monitor modules 125A may work in concert or in conjunction with one or more sensors 210 as described in FIG. 2 discussed below. Such sensors 210 may include, but are not limited to, heart rate sensors, blood pressure sensors, strain gauges, gyroscopes, accelerometers, pedometers, thermometers, thermocouples, glucometers, and other similar sensors as understood by one of ordinary skill in the art.

Figure 2:
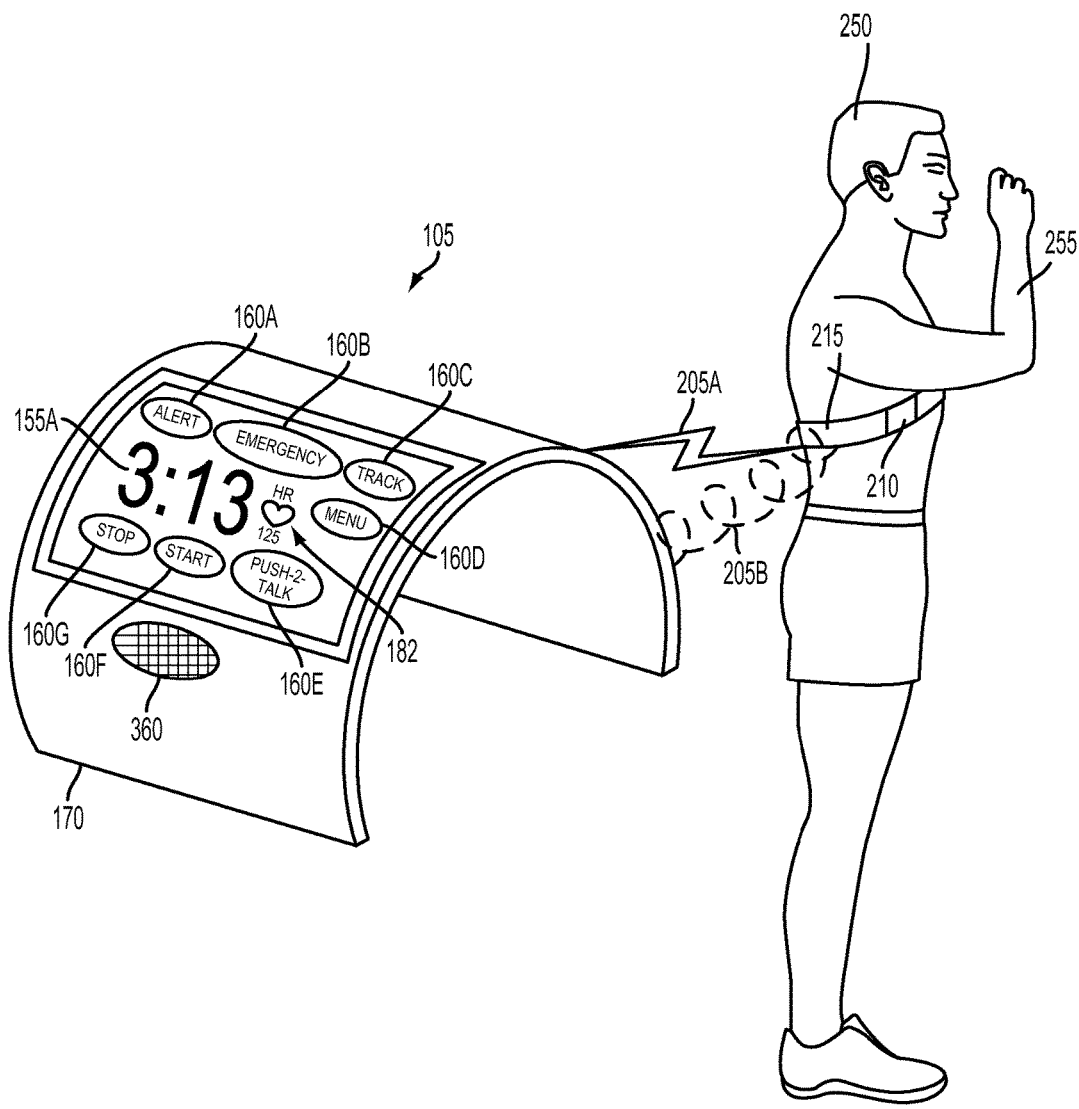
FIG. 2 is a diagram of a exemplary wearable wireless portable device having anatomical mounting hardware.

The monitor modules 125A and the sensors 210 of FIG. 2 may work in concert and/or in communication with one or more exercise or sports activity modules 130A. The exercise or sports activity modules 130A may be designed for specific physical activities that may include, but are not limited to, jogging, running, walking, bicycling, swimming, rowing, strength training, yoga, mountain biking, skiing, hiking, and mountain climbing. The system may track other similar physical activities that include all sports and sports related activities.

Each exercise or sports activity module 130A may be tailored for a specific physical activity. For example, a jogging sports activity module 130A may track the heart rate, calories burned, as well as the distance traveled by the operator of the wearable wireless portable device 105A. A swimming sports activity module 130A may also track and monitor heart rate, calories burned, water temperature, as well as the number of laps taken by the operator of the wearable wireless portable device 105A. The sports activity module 130A may also track and monitor time according to the activity selected by the wearable wireless portable device 105A.

In addition to tracking the exercise or sports activity of the operator of the wearable wireless portable device 105A, the exercise or sports activity module 130A may be configured to receive performance data that is transmitted to the wearable wireless portable device 105A from a second wearable wireless portable device 105B as illustrated in FIG. 1A. In one embodiment, the wearable wireless portable device 105A may receive data regarding other operators of another wearable wireless portable device 105B that may be participating in the same exercise or sports activity of the operator of the wearable wireless portable device 105A. Such performance data may include, but is not limited to, (1) geographical locations of other athletes or exercisers that may be shown on display 155, and (2) specific metrics of other athletes and exercisers. The specific metrics may include, but are not limited to, calories burned, current speed, current exercise rate, or athletic rate, etc. Performance data may include data from famous athletes who have uploaded and stored their exercise or sports activity data. In this way, the wearable wireless portable device 105 may foster competition among multiple athletes and/or exercisers in which these people may be significantly geographically diverse (i.e., separate from one another), such as people comparing performance data to one another who live in different towns, cities, states, countries, etc.

The exercise or sports activity module 130A may also track and monitor benchmarks associated with stored data such as benchmarks recorded and stored in the remote server 111 by famous or noteworthy athletes. In other words, the exercise or sports activity module 130A may provide a continuous comparison of a current exercise or sports activity of the operator of the wearable wireless portable device 105A to stored results of a famous or noteworthy athlete who has uploaded and stored his or her exercise or sports activity data (also referred to as performance data throughout this document). Details about these comparative functions performed by the exercise or sports activity module 130A will be described in further detail below in connection with FIG. 3 and FIG. 4.

The personal security module 135A may include hardware and/or software modules that allow the operator to select from a plurality of personal security features and functions. For example, the personal security module 135A may activate a function such that the position of the wearable wireless portable device 105A as monitored and detected by the GPS module 120A may be sent over the wireless communications network 142. This data may be received by the server 111. In this way, a third-party may monitor movement of the wearable wireless portable device 105A which has activated the personal security module 135A. The personal security module 135A may include user-defined functions such as an alert or an alarm button that may be depressed by the operator of the wearable wireless portable device 105A. The alert or alarm button may be depressed by the operator if he or she is experiencing a security issue, such as a robbery, kidnapping, assault, etc.

The personal security module 135A may also be programmed to provide periodic updates of the location of the wearable wireless portable device 105A as selected by the operator. The personal security module 135A may generate periodic text messages indicating that the status of the operator is good. Likewise, the personal security module 135A may also operate as a "kill switch." For this feature, the operator is required to push a button which transmits a message stating that the "operator is OK" according to certain time intervals and/or locations or both. When the operator of the wearable wireless portable device 105A does not push the button after a period of time and/or at a location or both, then an alarm signal may be triggered and generated by the wearable wireless portable device 105A. This alarm signal is communicated over the wireless communications network 142 to the server 111. The alarm signal in an exemplary embodiment may take the form of a text message. The generation of text messages may consume very little or low bandwidth. The text message functions may operate like conventional wireless devices which utilize 3G and 4G wireless connections.

The personal security module 135A may support other types of security features and/or functions. Such other types of security features and/or functions may include an alert feature that allows the operator of the wearable wireless portable device 105A to send an alert status to the server 111. With this alert status, a remote operator such as a second wearable wireless portable device 105B or a portable computing device 107 may be notified to start tracking or monitoring the status of the first wearable wireless portable device 105A.

In other words, the personal security module 135A may support an alert feature that does not require immediate action with respect to a party monitoring the location of the wearable wireless portable device 105A. This alert feature may only require the party who has access to the server 111 to start focusing on the location and movement of the wearable wireless portable device 105A until the operator of the wearable wireless portable device 105A indicates that further monitoring by the third party is no longer needed.

The personal security module 135A may also support emergency functions and/or features such as a 911 emergency call feature. This means when the 911 emergency call feature is activated, the personal security module 135A may be programmed to send the current location of the wearable wireless portable device 105A along with a predetermined or canned message. The canned message may include a text message and/or a voice message that identifies the name of the operator of the wearable wireless portable device 105A along with instructions for emergency personnel/first responders to come to the rescue of the operator immediately. The personal security module 135A may also support specific emergency functions such as identifying the category or type of emergency and requesting emergency assistance corresponding to the category or type selected by the operator of the wearable wireless portable device 105A.

That is, the personal security module 135A may support an emergency medical function, an emergency police function, and an emergency fire function, or any combination thereof. In this way, the operator of the wearable wireless portable device 105A may select the type of emergency that may be experienced by the operator so that proper emergency personnel/first responders are appropriately notified and requested to arrive at the location of the wearable wireless portable device 105A.

As noted above, the wearable wireless portable device 105A may also include one or more entertainment modules 140. The one or more entertainment modules 140 may support functions and/or features or a combination thereof that include, but are not limited to, audio players, video players, video games, and other entertainment functions. For example, the entertainment module 140 may include an MP3 player for playing audio files that include music files.

The wearable wireless portable device 105A may also include a camera 145 that may support conventional photographs as well as video. Further details about the camera 145 will be described below in connection with FIG. 1B. The wearable wireless portable device 105A may also include a speaker 150, a microphone 360, a display 155, and a user interface module 160. The user interface module 160 may be coupled to the speaker 150, the display 155, and the microphone 360.

The user interface module 160 may support or be part of an operating system ("OS") that is integrated with the graphics shown on a display 155 and which may support touch and keyed-in commands as well as voice activated commands. The user interface module 160 may provide for a simulated keyboard on the display 155. Alternatively, a physical keyboard or keypad 374 such as illustrated in FIG. 1B may be part of the user interface module 160.

The wearable wireless portable device 105A may also include one or more time modules 165 that may be coupled to the display 155, the speaker 150, and the exercise or sports activity modules 130A. The time modules 165 may track current time as well as times and other time zones throughout the world. The time modules 165 may be accessed and may provide data to the exercise or sports activity modules 130A such as, but not limited to, lap time, running or jogging rate, and other similar time features. The time modules 165 may be coupled to the display 155. The times tracked by the time modules 165 may be displayable to the operator of the wearable wireless portable device 105A.

The wearable wireless portable device 105A may also include portability hardware 170 which may take on various different forms. For example, the portability hardware 170 may include physical structures such as one or more bands coupled together so the wearable wireless portable device 105A is worn as a bracelet or like a watch. In other cases, the portability hardware 170 may include other bands, straps, or fasteners, so the wearable wireless portable device 105A may be worn on the other parts of the human anatomy. For example, the WWPD 105 A may be worn on the arm of a person as well as around the torso of a person. As a further example, the WWPD 105 may be worn as a pendant around a human neck and/or clipped-on to clothing.

The wearable wireless portable device 105A may also include a web browser module 175 that is coupled to the display 155B, user interface module 160, and the RF transceiver 115. The web browser module 175 may allow the operator to access the Internet as well as allowing various modules such as the GPS module 120A and the exercise or sports activity modules 130A to upload or download particular information.

The wearable wireless portable device 105A may also include a power supply 180. The power supply 180 may include, but is not limited to, batteries, capacitors, solar cells, mechanical power generation devices (i.e. self winding equipment), and any combination thereof as well as similar power supplies 18 known to one of ordinary skill the art.

In an embodiment, the wearable wireless portable device 105A may include a power management system configured to selectively deactivate, power down, de-energize, or reduce the power consumption needs of any or all of the components, resources (e.g., sensors, etc.), processors, modules, systems, and sub-systems of the wearable wireless portable device 105A based on determining that a communication link has been established to another device (e.g., WWPD 105B, mobile device, etc.) or in response to determining that the wearable wireless portable device 105A and the second device duplicate a functionality, are capable of performing the same or similar operations, or are capable of providing the user with the same or similar functionality or service.

The server 111 may include one or more modules which mirror those which are contained within or part of the wearable wireless portable device 105A. That is, the server 111 may include one or more GPS modules 120B, one or more exercise or sports activity modules 130B, one or more biological or physiological monitor modules 125B, and one or more personal security modules 135B. The modules of the server 111 may be complementary relative to the modules of the wearable wireless portable device 105A and may work in concert with the modules of the wearable wireless portable device 105A.

As noted previously, the server 111 may communicate with other wearable wireless portable devices 105B as well as other portable computing devices 107. Other portable computing devices 107 may include handheld computers, laptop computers, and desktop computers.

Referring to FIG. 1B, an exemplary, non-limiting embodiment of a wearable wireless portable device 105A is shown. The wearable wireless portable device 105A includes an on-chip system 322 that includes a multicore CPU 390. The multicore CPU 390 may include a zeroth core 394, a first core 396, and an Nth core 398. According to alternate exemplary embodiments, the CPU 390 may also include those of single core types and not one which has multiple cores.

As illustrated in FIG. 1B, a display controller 328 and a touch screen controller 330 are coupled to the multicore CPU 390. In turn, the display 155 external to the on-chip system 322 is coupled to the display controller 328 and the touch screen controller 330.

FIG. 1B further shows that a video encoder 334, e.g., a phase alternating line (PAL) encoder, a sequential color a memoire (SECAM) encoder, or a national television system(s) committee (NTSC) encoder, is coupled to the multicore CPU 390. Further, a video amplifier 336 is coupled to the video encoder 334 and the touch screen display 108. Also, a video port 338 is coupled to the video amplifier 336. As shown in FIG. 1B, a universal serial bus (USB) controller 340 is coupled to the multicore CPU 390. Also, a USB port 342 is coupled to the USB controller 340. Memory 392 and a subscriber identity module (SIM) card 346 may also be coupled to the multicore CPU 390.

Further, as shown in FIG. 1B, a digital camera 145 may be coupled to the multicore CPU 390. In an exemplary embodiment, the digital camera 145 is a charge-coupled device (CCD) camera or a complementary metal-oxide semiconductor (CMOS) camera.

As further illustrated in FIG. 1B, a stereo audio coder-decoder (CODEC) 350 may be coupled to the multicore CPU 390. Moreover, an audio amplifier 352 may coupled to the stereo audio CODEC 350. In an exemplary embodiment, a first stereo speaker 150A and a second stereo speaker 150B are coupled to the audio amplifier 352. FIG. 1B shows that a microphone amplifier 358 may be also coupled to the stereo audio CODEC 350. Additionally, a microphone 360 may be coupled to the microphone amplifier 358. In a particular embodiment, a frequency modulation (FM) radio tuner 362 may be coupled to the stereo audio CODEC 350. Also, an FM antenna is coupled to the FM radio tuner 362. Further, stereo headphones 366 may be coupled to the stereo audio CODEC 350.

FIG. 1B further illustrates that a radio frequency ("RF") transceiver 115 may be coupled to the multicore CPU 390. An RF switch 370 may be coupled to the RF transceiver 368 and an RF antenna 110A. As shown in FIG. 1B, a keypad 374 may be coupled to the multicore CPU 390. Also, a mono headset with a microphone 376 may be coupled to the multicore CPU 390. Further, a vibrator device 378 may be coupled to the multicore CPU 390.

FIG. 1B also shows that the power supply 180 may be coupled to the on-chip system 322. According to one embodiment, the power supply 180 is a direct current (DC) power supply that provides power to the various components of the wearable wireless portable device 105A that require power. Further, in a particular embodiment, the power supply 180 is a rechargeable DC battery or a DC power supply that is derived from an alternating current (AC) to DC transformer that is connected to an AC power source.

FIG. 1B further illustrates a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

The multicore CPU 390 may be coupled to software and/or hardware embodiments of the modules 120, 125, 130, 135, and 140 (120-140) which are described above in connection with FIG. 1A. These modules 120-140 may take the form of software and/or hardware, such as, but not limited to an application integrated circuit (ASIC), and/or firmware. These modules 120-140 of FIG. 1A are generally responsible for providing the global positioning functions, bio monitoring functions, exercise/athletic performance tracking functions, personal security functions, and entertainment functions as described above in connection with FIG. 1A.

As depicted in FIG. 1B, the touch screen or display 155, the video port 338, the USB port 342, the camera 145, the first stereo speaker 354, the second stereo speaker 356, the microphone 360, the FM antenna 364, the stereo headphones 366, the RF switch 370, the RF antenna 372, the keypad 374, the mono headset/microphone 376, the vibrator device 378, and the power supply 380 are external to the on-chip system 322.

According to another particular embodiment of the system, one or more of the method steps described herein may be stored in the memory 392 as computer program instructions, such as the modules 120, 125, 130, 135, and 140 described above in connection with the wearable wireless portable device 105A as illustrated in FIG. 1A.

These instructions may be executed by the multicore CPU 390 to perform the method steps described herein. Further, the multicore CPU 390 and memory 392 of the wearable wireless portable device 105A, or a combination thereof may serve as a means for executing one or more of the method steps described herein.

Figure 1C:
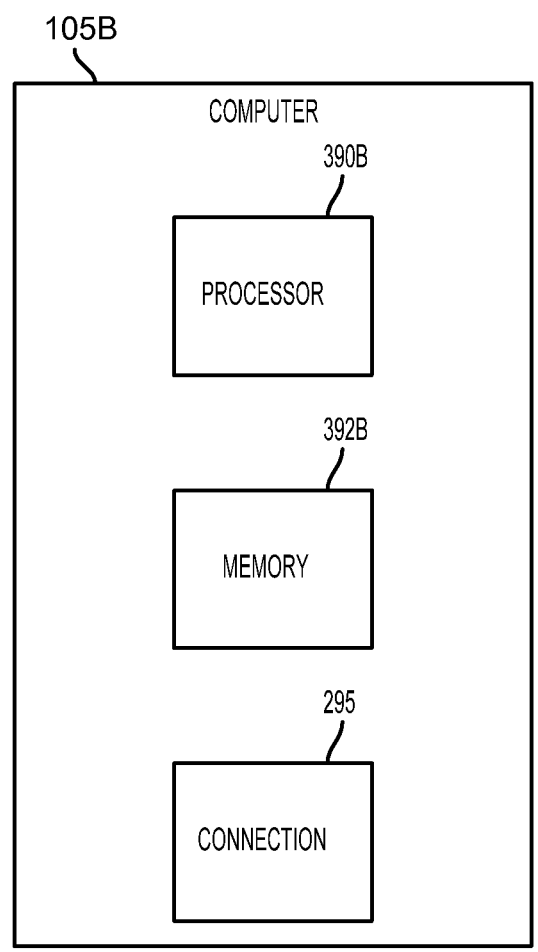
FIG. 1C is a functional block diagram of a computing device capable of mobile operation that may be in the form a wearable wireless portable device.

FIG. 1C illustrates various components of an embodiment computing device capable of mobile operation that may be in the form of wireless portable device 105B. Specifically, FIG. 1C illustrates that a wireless portable device 105B may include a processor 390B, a memory 392B, and a connection 295 module. The processor 390B may be configured by software instructions to perform a variety of methods, including the methods of the various embodiments described herein. For example, the processor 390B may include a programmable processor (e.g., x86, ARM), a digital signal processor ("DSP"), an application specific integrated circuit ("ASIC"), a field programmable gate array ("FPGA"), etc.

The processor 390B may be coupled to and/or execute modules 120-140, which are described above. The modules 120-140 may take the form of software and/or hardware, such as, but not limited to an application integrated circuit ("ASIC"), and/or firmware. These modules 120-140 of FIG. 1A are generally responsible for providing the global positioning functions, bio monitoring functions, exercise/athletic performance tracking functions, personal security functions, and entertainment functions as described above in connection with FIG. 1A.

The memory 392B may be any optical disk storage, any magnetic disk storage, or any other medium operable to store logic and/or data accessible by the computer. The memory 392B may include random access memory ("RAM"), read-only memory ("ROM"), electrically erasable programmable read-only memory ("EEPROM"), or any type of solid-state memory that is suitable for compact electronic packaging for a wearable wireless portable device 105.

The connection 295 may generally allow connectivity to other computers, wireless devices, laptops, servers, etc. The connection 295 may include a network interface card ("NIC"), a modem, a universal serial bus port ("USB"), a Firewire port, a 3G/4G wireless modem, a near-field communication connection ("NFC"), etc. The connection 295 may be any other wired connection, any other wireless connection, any other magnetic connection, any other visual connection, any other audible connection, etc.

FIG. 2 is a diagram of an example wearable wireless portable device 105 having security monitoring and communication functions contained within anatomical mounting hardware 170. In the exemplary embodiment illustrated in FIG. 2, the anatomical mounting hardware 170 includes a bracelet or ornamental shell suitable for wearing on an arm 255 of a human subject 250. As discussed above, the wearable wireless portable device 105 is not limited to anatomical mounting hardware 170 suitable only for mounting on an arm 255. The mounting hardware 170 may include other elements such as a chain, pin, clip or other type of mechanical fasteners such that the wearable wireless portable device 105 may be worn on other regions of the body. For example, the WWPD 105 may take the form as a pendant for wearing around a neck. The WWPD 105 may include a unit for attaching to a bicep, or a unit worn on the waist of a human subject 250.

In the exemplary embodiment illustrated in FIG. 2, the display 155A of the wearable wireless portable device 105 may provide numerous pieces of information for the operator such as, but not limited to, the current time of day, and a heart rate 182 of the operator or human subject 250. The display 155A may also show other user interface elements 160A-160G as will be described in further detail below.

The wearable wireless portable device 105 may be coupled to one or more different types of sensors 210. In the exemplary embodiment illustrated in FIG. 2, the sensor 210 may include a heart rate sensor. However, other types of sensors are included within the scope of the invention and may include, but are not limited to, breathing sensors, oxygenation sensors, perspiration sensors, blood pressure sensors, glucose meters, temperature sensors, and other like sensors. Other like sensors may measure various different types of physiological parameters that are helpful in monitoring and tracking performance during exercise and athletic activities.

In the exemplary embodiment illustrated in FIG. 2, the heart rate sensor 210 may be supported by a strap 215. Other mounting hardware besides the strap 215 for the sensor 210 may be employed as understood by one of ordinary skill in the art. The wearable wireless portable device 105 may be coupled to the sensor 210 via a wireless connection 205A. Wireless connections include, but are not limited to, radiofrequency couplings, magnetic couplings, infrared, and acoustic couplings. Other wireless connections not specifically mentioned are well within the scope of the invention as understood by one of ordinary skill in the art. In an alternative embodiment, a wired connection 205B may be used to couple the sensor 210 to the wearable wireless portable device 105.

The seven user interface elements 160A-160G may be suitable for a display 155A that supports touch-screen type features. This means that for the seven user interface elements 160A-160G, when the operator touches one or more of these user interface elements 160A-160G, then one or more functions and/or features supported by the wearable wireless portable device 105 may become active or accessed by the operator/human subject 250.

The first user interface element 160A may include an alert button for creating an alert message as described above in connection with FIG. 1A. Such an alert feature may include one that allows the operator of the wearable wireless portable device 105A to send an alert status to the server 111. The server may in turn transmit the alert to a remote operator such as a second wearable wireless portable device 105B or a portable computing device 107 as illustrated in FIG. 1A. The portable computing device 107 may be notified to start tracking or monitoring the status of the first wearable wireless portable device 105A.

In other words, the personal security module 135A of the wearable wireless portable device 105 may support an alert feature that does not require immediate action with respect to a party monitoring the location of the wearable wireless portable device 105A. This alert feature, when activated by the first user interface element 160A, may only require the party who has access to the server 111 to start focusing on the location and movement of the wearable wireless portable device 105A. The party may stop monitoring the location and movement of the WWPD 105A when the operator of the WWPD 105A indicates that further monitoring by the third party is no longer needed The second user interface element 160B may support an immediate or urgent response feature as described above in connection with FIG. 1A. That is, the second user interface element 160B may support emergency functions and/or features such as a 911 emergency call feature. This means when the 911 function or "Emergency" button feature associated with user interface element 160B is activated, the personal security module 135A may be programmed to send the current location of the wearable wireless portable device 105A. The WWPD 105A may also send a message that may include a text message and/or a voice message. The text message and/or voice message may identify the name of the operator of the wearable wireless portable device 105A along with instructions for emergency personnel or first responders to come to the rescue of the operator substantially immediately.

The personal security module 135A as activated by the second user interface element 160B may also support specific emergency functions such as identifying the category or type of emergency. The second user interface element 160B may request emergency assistance corresponding with the category or type selected by the operator of the wearable wireless portable device 105A. This means that the personal security module 135A may support an emergency medical function, an emergency police function, and an emergency fire function, or any combination thereof.

In this way, the operator of the wearable wireless portable device 105A may select the type of emergency that may be experienced by the operator after the second user interface element 160B "Emergency" button is activated. This allows proper emergency personnel or first responders to be appropriately notified and requested to arrive at the location of the wearable wireless portable device 105A.

The third user interface element 160C may support a function in which the operator desires to record and store current exercise or competition/performance data with the wearable wireless portable device 105. The third user interface element 160C may also activate the competition feature described above in connection with FIG. 1A.

The third user interface element 160C may activate the exercise or sports activity module 130A such that the WWPD 105A receives performance data that is transmitted to the wearable wireless portable device 105A from other wearable wireless portable devices 105B as illustrated in FIG. 1A. Similarly, activation of the third user interface element 160C may also cause the exercise or sports activity module 130A to transmit the current performance data of the operator/human subject 250 of the WWPD 105A over the wireless communications network 142 to the server 111.

In one exemplary embodiment, activation of the third user interface element 160C may initiate the feature in which the wearable wireless portable device 105A receives data regarding other operators of other WWPDs 105B that may be participating in the same exercise or sports activity of the operator/human subject 250 of a particular WWPD 105A. Such performance data may include, but is not limited to, geographical locations of other athletes or exercisers that may be shown on display 155, and specific metrics of other athletes such as calories burned, current speed, current exercise or athletic rate, etc. In this way, the wearable wireless portable device 105 may foster competition among multiple athletes and/or exercisers in which these people may be significantly geographically diverse (separate from one another). For example, this may include people comparing performance data to one another who live in different towns, cities, states, countries, etc.

The fourth user interface element 160D may activate a "menu" function that may display various options and/or functions that may be supported by the wearable wireless portable device 105. This fourth user interface element 160D may cause a menu to be shown on the display 155A so the operator/human subject 250 may select from the menu elements.

The fifth user interface element 160E may support/activate the "Push-To-Talk" or "Push-To-Transmit" feature described in connection with FIG. 1A above. In one embodiment, activation of the fifth user interface element 160E may initiate QChat®-based instantaneous communications such that the operator/human subject 250 may conduct communications using the speaker 150. As noted previously, QChat® is a software application which was developed by Qualcomm, Inc. based in San Diego, Calif. QChat® provides a reliable method of instant connection and two-way communication between users in different locations. QChat® allows users of the wearable wireless portable device 105A to connect instantaneously with other QChat® users anywhere in the world with the push of a button, such as the fifth user interface element 160E.

The sixth and seventh user interface elements 160F, 160G may support conventional chronological features such as the starting and the stopping of a stopwatch such that the operator/human subject 250 may track time for an exercise or other form of athletic activity. The six and seven user interface elements 160F, 160G may be coupled to one or more time modules 165 as described above in connection with FIG. 1A.

Figure 3:
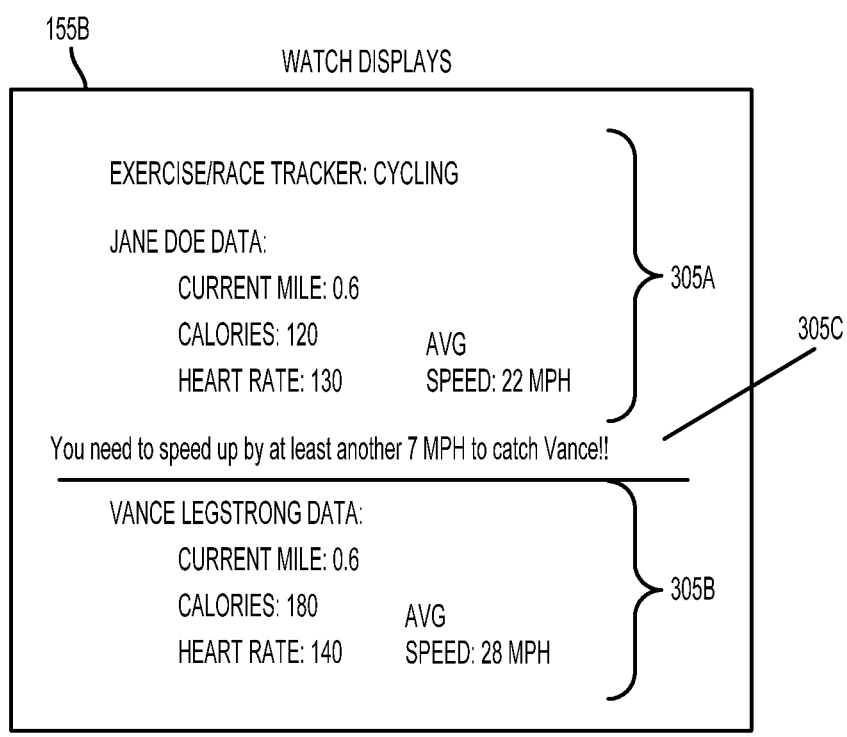
FIG. 3 is a diagram of a screen for displaying exercise data and competition data for an operator of the wearable wireless portable device.

FIG. 3 is a diagram of a screen/display 155B for displaying exercise data 305A and competition data 305B for an operator of the wearable wireless portable device 105. This screen/display 155B may be generated by the exercise or sports activity module 130A which may receive performance data transmitted to the wearable wireless portable device 105A from other wearable wireless portable devices 105B as illustrated in FIG. 1A. In other words, the wearable wireless portable device 105A may receive data, like competition data 305B, related to or associated with other operators of other wearable wireless portable devices 105B. These other WWPDs 105B may be participating in the same exercise or sports activity of the operator of the wearable wireless portable device 105A.

Such performance data may include, but is not limited to, geographical locations of other athletes or exercisers that may be shown on display 155. In one embodiment, specific metrics of other athletes and exercisers such as calories burned, current speed, and current exercise or athletic rate, etc. may be shown on the display 155. In this way, the wearable wireless portable device 105 may foster competition among multiple athletes and/or exercisers in which these people may be significantly geographically diverse (separate from one another). This includes people comparing performance data to others, who may live and compete in different towns, cities, states, countries, etc.

In the exemplary embodiment illustrated in FIG. 3, the exercise or athletic activity data 305A of the operator of the wearable wireless portable device 105A may include information relating to the activity of bicycling. The athletic data 305A shown on display 155B may include information such as but not limited to, distance traversed by the operator during the activity, the amount of calories burned during the activity, the current heart rate of the operator, and the average speed in miles per hour (MPH).

As noted previously, the exercise or sports activity module 130A may also track and monitor benchmarks associated with stored data such as benchmarks recorded and stored at a server 111 by famous or noteworthy athletes. In one embodiment, the exercise or sports activity module 130A may provide a continuous comparison of a current exercise or sports activity of the operator of the wearable wireless portable device 105A to stored results of a famous or noteworthy athlete. The famous athlete may have uploaded and stored his or her exercise or sports activity data (also referred to as performance data throughout this document).

In the exemplary embodiment illustrated in FIG. 3, the competition data 305B may include benchmarks set by a famous athlete. In this particular example, the famous athlete is in the bicycling field. This competition data 305B may have the same parameters as the athletic activity data 305A. In this particular example, the competition data 305B also includes distance traversed by the athlete at the same location as the operator during the activity, the amount of calories burned during the activity at the same stage for the athlete, the recorded heart rate of the athlete at the same stage of the activity, and the recorded average speed in miles per hour for the athlete at the same stage of activity.

As described above, the competition data 305B may also include real-time information of another operator of a wearable wireless portable device 105B. If the operator Jane was racing the operator Vance Legstrong in a live or current activity, then the athletic activity data 305A and competition data 305B would be current, and the parameters for the athletic activity being monitored by the two or more wearable wireless portable devices 105A, 105B would change.

In addition to the exercise data 305A and the competition data 305B, the wearable wireless portable device 105, and specifically, the exercise or sports activity module 130A may also provide recommendations 305C to the operator so the exercise data 305A may become closer to the competition data 305B or possibly exceed the competition data 305B. For example, if Jane Doe is in a race against the operator Vance Legstrong, then the exercise module may try to help Jane win against Vance. In one embodiment, the exercise or sports activity module 130A may compare the exercise data 305A to the competition data 305B. The exercise or sports activity module 130A may also determine that if the operator of the WWPD 105A increases their average speed by at least six miles per hour, then the operator may be able to keep up with their competition in the athletic activity being tracked by the competition data 305B.

Figure 4:
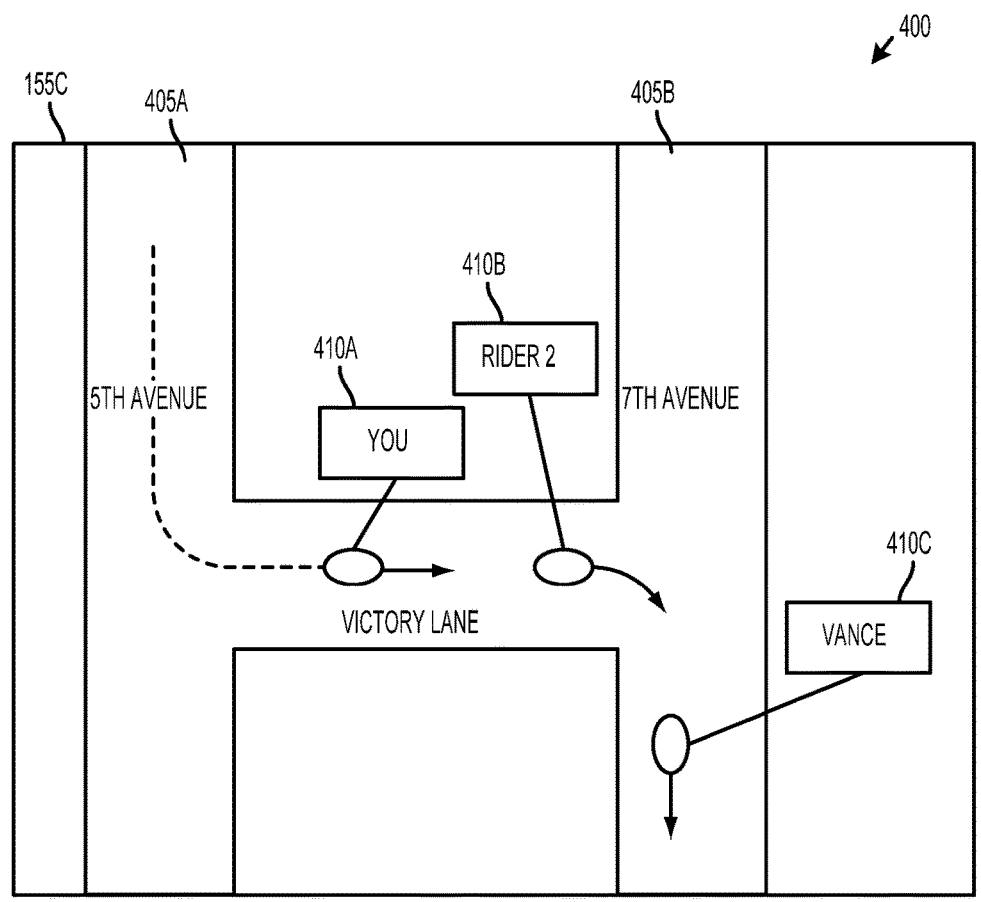
FIG. 4 is a diagram of a screen for displaying a location of the wearable wireless portable device relative to geographical elements and relative to other wearable wireless portable devices.

FIG. 4 is a diagram of a screen 155C for displaying a location of the wearable wireless portable device 105A on a map 400 relative to geographical elements. Geographical elements may include streets 426, 428 and the screen 155C may show a first WWPD 105A relative to other locations 422, 424 of second and third WWPDs 105B, 105C. In one embodiment, the map 400 may be generated by the GPS module 120A in combination with the exercise or sports activity module 130A.

As noted above, the GPS module 120A may also transmit calculated geographical coordinates of the WWPD 105A over the wireless communications network 142 to the server 111 using the RF transceiver 115. In this way, a map 400 may be displayed on other devices 105B and 107 that shows real-time geographical coordinates of the WWPD 105A. In map 400, the operator of the wearable wireless portable device 105A is designated by reference character 420. Meanwhile, other wearable wireless portable devices 105B, 105C have transmitted their respective geographical locations as indicated by reference characters 422 and 424. These coordinates of the WWPDs 105A, 105B, and 105C may be processed and tracked by the exercise or sports activity module 130A and the GPS module 120A.

The wearable wireless portable devices 105A, 105B, and 105C are represented with oval icons as illustrated in FIG. 4. However, other types of icons that may designate the type of activity being monitored may be used as understood by one of ordinary skill in the art. For example, instead of the ovals used in FIG. 4, bicycle-shaped icons or runner-shaped icons may be used to denote bicycling or running. Other icon shapes and types representative of other activities may be used as understood by one of ordinary skill in the art.

Figure 5:
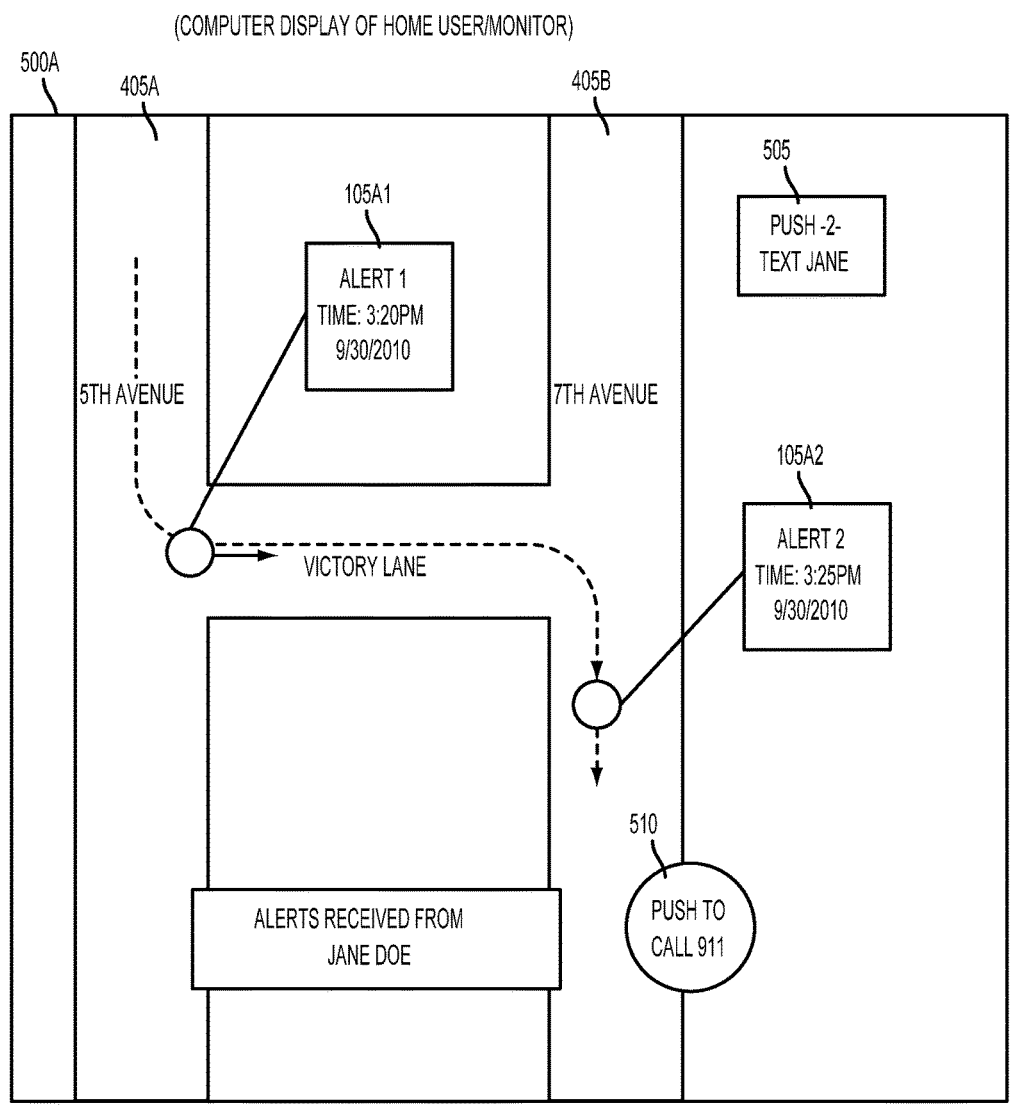
FIG. 5 is a diagram of a screen of a remote portable computing device for displaying a location of the wearable wireless portable device relative to geographical elements such as streets.

FIG. 5 is a diagram of a screen 500 of a remote portable computing device 107 for displaying a location of the wearable wireless portable device 105A relative to geographical elements such as streets 426, 428. Screen 500 may be generated based on the coordinates received from a GPS module 120A and information received from the personal security module 135A of wearable wireless portable device 105A.

The portable computing device 107 may be coupled to the server 111 via the wireless communications network 142. Screen 500 may be generated in response to the alert function supported by the personal security module 135A which allows the operator of the wearable wireless portable device 105A to send an alert status to the server 111. These alerts may cause the portable computing device 107 to start tracking or monitoring the status of the first wearable wireless portable device 105A.

In one embodiment, the personal security module 135A may support an alert feature that does not require immediate action with respect to a party monitoring the location of the wearable wireless portable device 105A, such as a party reviewing screen 500 of FIG. 5. This alert feature only may require the party who has access to the server 111 to start focusing on the location and movement of the wearable wireless portable device 105A.

For example, Jane Doe is a bicyclist who decided to generate a first alert 105A1 at time 3:20 pm on Sep. 30, 2010 as illustrated in FIG. 5. Jane activated this alert by pressing the alert button (e.g., user interface element 160A of FIG. 2). After traveling from location designated by the first alert 105A1 in FIG. 5, Jane decided to cancel the alert status by pressing the alert button (i.e., user interface element 160A of FIG. 2) when she reached the second alert location indicated by the second alert 105A2 at 3:25 pm in FIG. 5. Jane decided to cancel the alert since she felt she was riding in a safer area compared to the location of her first alert 105A1 of FIG. 5.

The GPS module 120A of a WWPD 105A may continuously transmit its location to the server 111 such that this continuous movement data may be displayed in screen 500 for the remote portable computing device 107. Screen 500 may support various user interfaces that allow an operator to communicate with the operator of the wearable wireless portable device 105A.

For example, the first user interface element 505 of the screen 500 may include a push-to-text feature that allows the operator of the portable computing device 107 to send text or simple messaging service ("SMS") messages to the operator of the wearable wireless portable device 105A. A second user interface element 510 may include an on-screen button that allows the operator of the portable computing device 107 to get in contact with first responders such as police, fire, and rescue departments. Other user interface elements may be used as understood by one of ordinary skill in the art.

Figure 6:
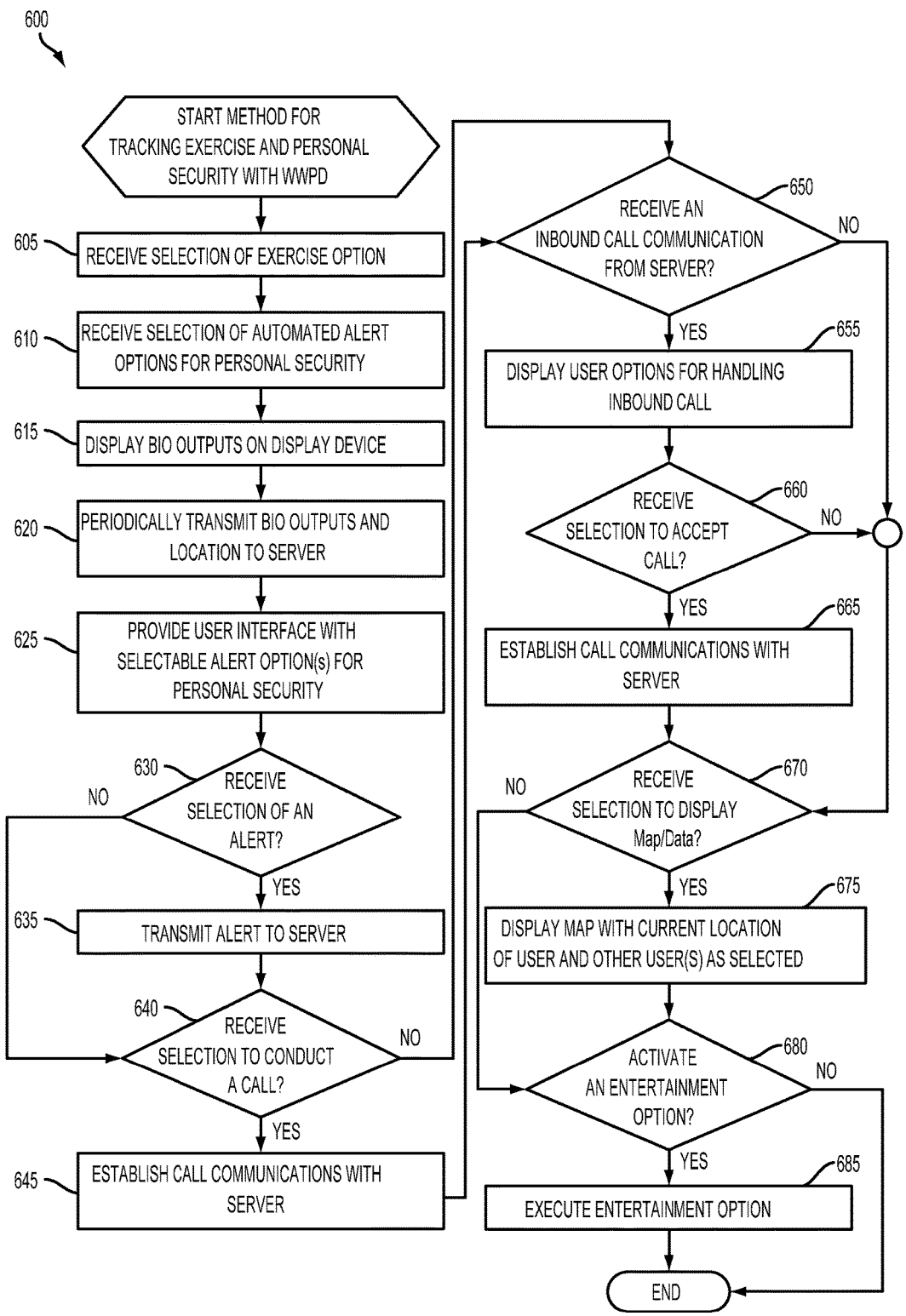
FIG. 6 is a flowchart illustrating a method for tracking exercise and personal security with a wearable wireless portable device.

FIG. 6 is a flowchart illustrating a method 600 for tracking exercise and personal security with a wearable wireless portable communication device. Block 605 is the first step of the method 600 in which the exercise or sports activity module 130A may receive a selection of the type of exercise that an operator of the wearable wireless portable device 105 desires to track. Next, in block 610 the personal security module 135A may receive a selection of one or more options for generating alerts that are transmitted to the server 111 over the wireless communications network 142. Such options that may be selected include the exemplary first user interface element 160A as illustrated in FIG. 2 in which an operator of the wearable wireless portable device 105 may activate an alert by selecting or touching the "alert button" on the screen/display 155A.

Next, in block 615, the biological or physiological monitor module 125A and/or the exercise or sports activity module 130A may display one or more biological or physiological outputs on the display 155A. For example, a heart rate 182 may be displayed on the screen/display 155A as illustrated in FIG. 2. However, other physiological outputs and/or calculated parameters, like calories burned, etc. may be displayed as options selected by the operator. For example, an operator may decide to select options for displaying heart rate and calories burned simultaneously on the screen/display 155A.

In block 620, the wearable wireless portable device 105 may periodically transmit the tracked biological or physiological outputs as well as the geographical location of the wearable wireless portable device 105 (as determined by the GPS module 120A) to the server 111. In block 625D, the user interface module 160 may provide user interface elements for personal security such as the first and second user interface elements 160A, 160B as illustrated in FIG. 2.

As described above, the first user interface element 160A may be related to an alert function that may be selectable by the operator of the wearable wireless portable device 105. The second user interface element 160B may support an emergency call function as described above. Other personal security functions that may be tracked by the wearable wireless portable device 105 are included as understood to one of ordinary skill in the art.

In decision block 630, the personal security module 135A may determine if an alert function has been selected by the operator of the wearable wireless portable device 105. If the inquiry to decision block 630 is negative, then the "NO" branch is followed to decision block 640. If the inquiry to decision block 630 is positive, then the "YES" branch is followed to block 635 in which the personal security module 135A may transmit an alert to the server 111 that may be translated into a graphical display such as screen 500 and specifically, the first alert 105A1 as illustrated in FIG. 5.

Next, in decision block 640, the RF transceiver module 115 in combination with the central processing unit 390 may determine if the operator of the wearable wireless portable device 105 desires to conduct a telephone call. If the inquiry to decision block 640 is negative, then the "NO" branch is followed to decision block 650. If the inquiry to decision block 640 is positive, then the "YES" branch is followed to block 645 in which the RF transceiver 115 establishes call communications with the server 111 and/or a cellular telephone network or wireless communications network 142. Decision block 640 may also correspond with an operator selecting the "Push-to-Talk" feature corresponding to the user interface element 160E as illustrated in FIG. 2.

In decision block 650, the CPU 390 and/or the RF transceiver 115 may determine if the wearable wireless portable device 105 is receiving an inbound call communications from the server 111 or from a cellular communications network or wireless communications network 142. If the inquiry to decision block 650 is negative, then the "NO" branch is followed to decision block 670. If the inquiry to decision block 650 is positive, then the "YES" branch is followed to block 655 in which one or more options may be displayed on the display 155 to explain how the operator of the wearable wireless portable device 105 may handle a particular call. For example, an operator may elect to take the call and activate the speaker 150. Alternatively, the operator may choose to ignore the call and transfer the call to a voicemail-to-text feature supported by the server 111.

In decision block 660, the CPU 390 may determine if a selection was made by the operator of the wearable wireless portable device 105 to accept the inbound call. If the inquiry to decision block 660 is negative, then the "NO" branch is followed to decision block 670. If the inquiry to decision block 660 is positive, then the "YES" branch is followed to block 665 in which call communications are established with the server 111 and/or a respective cellular telephone communication network or wireless communications network 142.

In decision block 670, the GPS module 120A and or the exercise or sports activity module 130A may determine if an operator has selected an option to display a map and/or competition data. If the inquiry to decision block 670 is negative, then the "NO" branch is followed to decision block 680. If the inquiry to decision block 670 is positive, then the "YES" branch is followed to block 675. In this step, map 400 of FIG. 4 may be displayed with a current location of the operator such as location 420 and the locations 422, 424 of other users.

In decision block 680, the entertainment module 140 may determine if an operator of the wearable wireless portable device 105 has selected an entertainment option. For example, an operator may select playing an audio file like an MP3 type audio file and or a video file in this block. If the inquiry to decision block 680 is negative, then the method 600 ends. If the inquiry to decision block 680 is positive, then the "YES" branch is followed to block 685. In this block 685, the entertainment module 140 may execute one or more of the selected entertainment options, such as playing an audio file, a video file, or a game. The method 600 proceeds to the last block and then ends.

Figure 7:
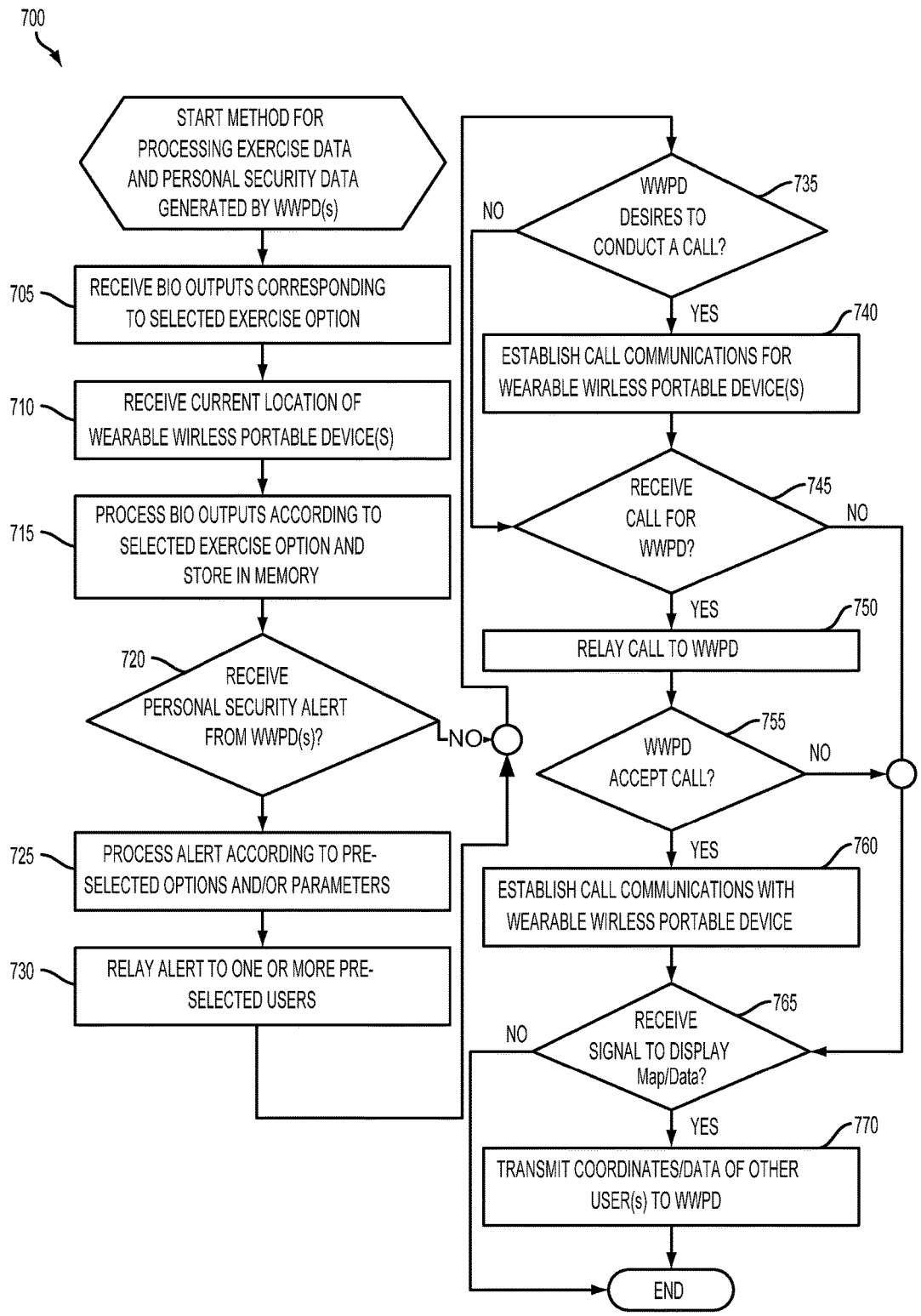
FIG. 7 is a flowchart illustrating a method for processing exercise data and personal security data generated by one or more wearable wireless portable devices.

FIG. 7 is a flowchart illustrating a method 700 for processing exercise data and personal security data generated by one or more wearable wireless portable devices. The first block in the method 700 which is typically executed by the server 111 is block 705. In block 705, the server 111 may receive biological or physiological outputs corresponding to the options selected by the operator of a wearable wireless portable device 105 that are transmitted over the wireless communications network 142 to the server 111.

Next, in block 710, the server 111 may receive the current location of one or more wearable wireless portable devices 105 that are generated by respective GPS modules 120A. In block 715, the server 111 may process the biological and/or physiological outputs according to the selected exercise option and store these results in memory. For example, the server 111 may track and compare the current biological and or physiological outputs being transmitted over the wireless communications network 142 to base-line measurements and/or readings in order to determine if there are any problems for the operator of the wearable wireless portable device 105.

Subsequently, in decision block 720, the server may determine 110 if it has received one or more security alerts from one or more wearable wireless portable devices 105. If the inquiry to decision block 720 is negative, then the "NO" branch is followed to decision block 735. If the inquiry to decision block 720 is positive, then the "YES" branch is followed to block 725 in which the server 111 processes the alert according to preselected options and/or perimeters transmitted from the wearable wireless portable device 105A.

In this block 725, the server 111 may generate screen 500 of FIG. 5 and provide the interactive user interface elements 505 and 510 that may be selectable by the operator of the portable computing device 107. In block 730, the server 111 may relay the alert to one or more preselected users such as one or more other wearable wireless portable devices 105B, 105C such as illustrated in FIG. 1A and FIG. 4.

Next, in decision block 735, the server 111 or a cellular telephone network or wireless communications network 142 may determine if the operator of the wearable wireless portable device 105 desires to conduct a call. This call may include the "Push-to-Talk" feature described above and/or a conventional cellular telephone network call.

If the inquiry to decision block 735 is negative, then the "NO" branch is followed to decision block 745. If the inquiry to decision block 735 is positive, then the "YES" branch is followed to block 740 in which a call communication for the wearable wireless portable device is established with a cellular telephone network, wireless communications network 142 and/or a server 111.

In decision block 745, a server 111 and/or cellular phone network or wireless communications network 142 may determine if a call has been received for retransmission to a wearable wireless portable device 105. If the inquiry to decision block 745 is negative, then the "NO" branch is followed to decision block 765. If the inquiry to decision block 745 is positive, then the "YES" branch is followed to block 750 in which the server 111 and/or cellular telephone network or wireless communications network 142 relays the phone call to the wearable wireless portable device 105.

In decision block 755, the server 111 and/or cellular phone communication network may determine if the wearable wireless portable device 105 will accept the relayed call. If the inquiry to decision block 755 is negative, then the "NO" branch is followed to decision block 765. If the inquiry to decision block 755 is positive, then the "YES" branch is followed to block 760 in which the server 111 and/or cellular-phone communication network or wireless communications network 142 establishes the call with the wearable wireless portable device 105.

Next, in decision block 765, the server 111 may determine if the server 111 has received a signal to display a map and or competition data for other wearable wireless portable devices 105. The signal may be generated by the GPS module 120A and/or the exercise or sports activity module 130A of a wearable wireless portable device 105.

If the inquiry to decision block 765 is negative, then the "NO" branch is followed in which the process/method 700 ends. If the inquiry to decision block 765 is positive, then the "YES" branch is followed to block 770 in which the server 111 may transmit geographical coordinates and/or competition data of other users to the wearable wireless portable device 105. These geographical coordinates may allow the GPS module 120A to generate the screen 155C as illustrated in FIG. 4. The competition data may allow the exercise or sports activity module 130A to produce the screen/display 155B as illustrated in FIG. 3. The process/method 700 then ends.

The wearable wireless portable device ("WWPD") 105 may be a compact and lightweight device that includes WAN communications circuitry (e.g., cellular transceiver, etc.) for establishing a direct connection to a telecommunication network and a low-power short range radio (e.g., WiFi or Bluetooth® radio) for establishing an indirect connection to the telecommunication network via the communications circuitry of the more feature-rich mobile device. The WWPD 105 may be configured to communicate with a more feature-rich mobile device (e.g., smartphone, etc.) via low-power short range communication technologies when it is in close proximity to the mobile device, and activate the WAN communications circuitry to provide cellular or similar wireless network connectivity when it is not in close proximity to the mobile device. Since the WAN communications circuitry is energized only when the WWPD 105 is not in close proximity to the mobile device (i.e., when it cannot use a low-power short range communication in order to user resources and communicate via the WAN circuitry of the mobile device), WWPD 105 does not require the bulky battery systems typically included in smartphones and other feature rich mobile devices. This enables the WWPD 105 to be packaged into a small and lightweight device, such as a wrist watch or pendant.

Figure 8:
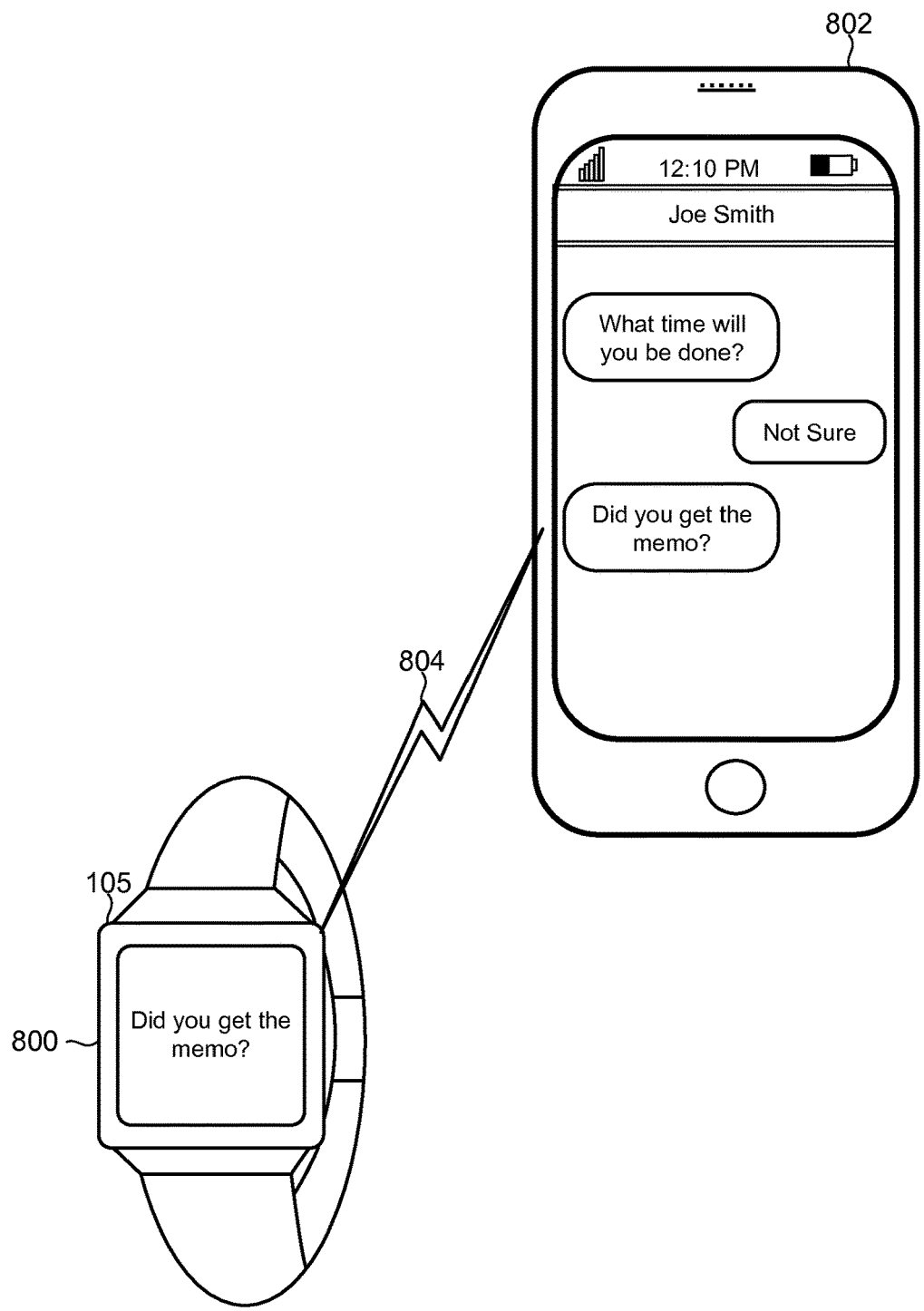
FIG. 8 is a communication diagram illustrating a low-power short range communication link between a wearable wireless device and a mobile device.

FIG. 8 is a block diagram illustrating communication links and information flows between an embodiment wearable wireless portable device ("WWPD") 105 in the form a wrist display 800 and a portable computing device in the form of a smart phone 802. The WWPD 105 and the smart phone 802 may communicate via low-power short-range wireless communication links 804. In various embodiments, the low-power short range communication links 804 may be WiFi, Bluetooth® low energy (BLE), ANT, ANT Plus, PeaNUT®, or ZigBee® communication links. In an embodiment, the low-power short range communication links 804 may be Bluetooth® communication links.

Generally, Bluetooth® technology provides a power-efficient (i.e., low power) and secure way to connect and exchange information between electronic devices (e.g., headphones, cellular phones, watches, laptops, remote controls, etc.). Because many of the services offered over Bluetooth® can expose private data and/or allow the connecting party to control the connected device, Bluetooth® may require that devices first establish a "trust relationship"

before they are allowed to connect to one another. This trust relationship may be established via a process called "pairing."

In an embodiment, the WWPD 105 and/or smart phone 802 may be configured to automatically initiate the pairing operations and establish Bluetooth® communication links 804 when they are moved to within a certain distance (e.g., 100 meters, etc.) of each other, referred to herein as the communication distance. Due to the low-power and relatively short range characteristics of Bluetooth®, such Bluetooth® communication links 804 are referred to herein as a low-power short range communication link. However, such power-efficient communication links may be established using other technologies, such as WiFi, PeaNUT®, etc., each of which are encompassed within the term low-power short range communication link used herein.

In various embodiments, the WWPD 105 and/or smart phone 802 may each include a memory storing pairing information relating to a current or previously established pairing in a memory. The stored pairing information may include a name field, an address field, a link key field, and other similar fields (e.g., profile type, etc.) useful for authenticating the devices and/or establishing the low-power short range communication link 804. In an embodiment, WWPD 105 and/or smart phone 802 may store the pairing information in a paired device list (PDL).

The WWPD 105 and/or the smart phone 802 may be configured to use locally stored pairing information to automatically establish the low-power short range communication link 804 when they are in close proximity to each other, without further authentication or user interaction. After the low-power short range communication link 804 is established, the WWPD 105 may communicate with the smart phone 802 via the low-power short range communication link 804. For example, the smart phone 802 may relay incoming communications and/or alerts to the WWPD 105 over the low-power short range communication link 804. Incoming communications may include voice calls (e.g., PSTN call, VOIP call, cellular call, etc.), text based messages (e.g., SMS, e-mail), social media messages (e.g., Facebook® notification, Tweet®, etc.), recorded messages (e.g., a recorded voice message from a YagattaTalk® user), and application reminders (e.g., E-bay® auction notification, remote based calendar application reminder, etc.).

In an embodiment, the smart phone 802 may be configured to generate an alert message in response to receiving an incoming communication. The alert message may include information pertaining to the received communication, such as communication type (i.e., call, text message, e-mail), the sender/caller identification (ID), an urgency indicator (e.g., a flag, classification, or other description), information about the device originating the incoming communication, a text message, etc. The smart phone 802 may send the generated alert message to the WWPD 105 via the low-power short range communication link 804. The WWPD 105 may receive the alert message, select a suitable user notification method (e.g., a vibration, series of vibrations, displayed graphic, etc.), and inform the user of the incoming communication via the selected user notification method. User notification methods may include an audio notification method (e.g., playing a sound, etc.), a visual notification method (e.g., displaying a pop-up message, image, etc.), and/or a haptic notification method (e.g., generating a vibration).

In various embodiments, the WWPD 105 may be configured to control any or all of the features, functions, and operations of the smart phone 802 via the low-power short range communication link 804. For example, the WWPD 105 may be configured to detect inputs from user interactions with a graphical user interface and/or sensors (e.g., accelerometers configured to detect a tap) of the WWPD 105, generate messages for transmission to the smart phone 802 based on the detected inputs, and send the generated message to the smart phone 802 over the low-power short range communication link 804. The smart phone 802 may receive the generated messages and perform operations based on the received message and/or detected inputs. For example, the WWPD 105 may be configured to detect a user input (e.g., voice command, actuating a button, etc.) for establishing a voice call, generate a command message instructing the smart phone 802 to establish a connection to a telecommunication network, and send the command message to the smart phone 802 to cause the smart phone 802 to establish a connection to the telecommunication network for achieving the voice call. As a further example, during a voice call, the WWPD 105 may relay detected sounds to the smart phone 802 for transmission over the telecommunication network.

In an embodiment, the WWPD 105 may be configured to establish an indirect connection to the telecommunication network (i.e., use the network connectivity of the smartphone 802) by default or when possible, such as when the low-power short range communication link 804 is available. It is also contemplated that the indirect connection to the telecommunication network may be initiated by to mobile device such as smartphone 802.

In an embodiment, the WWPD 105 may be configured to establish a direct connection after determining an indirect connection is not available, such as when the low-power short range communication link 804 cannot be established.

Figure 9:
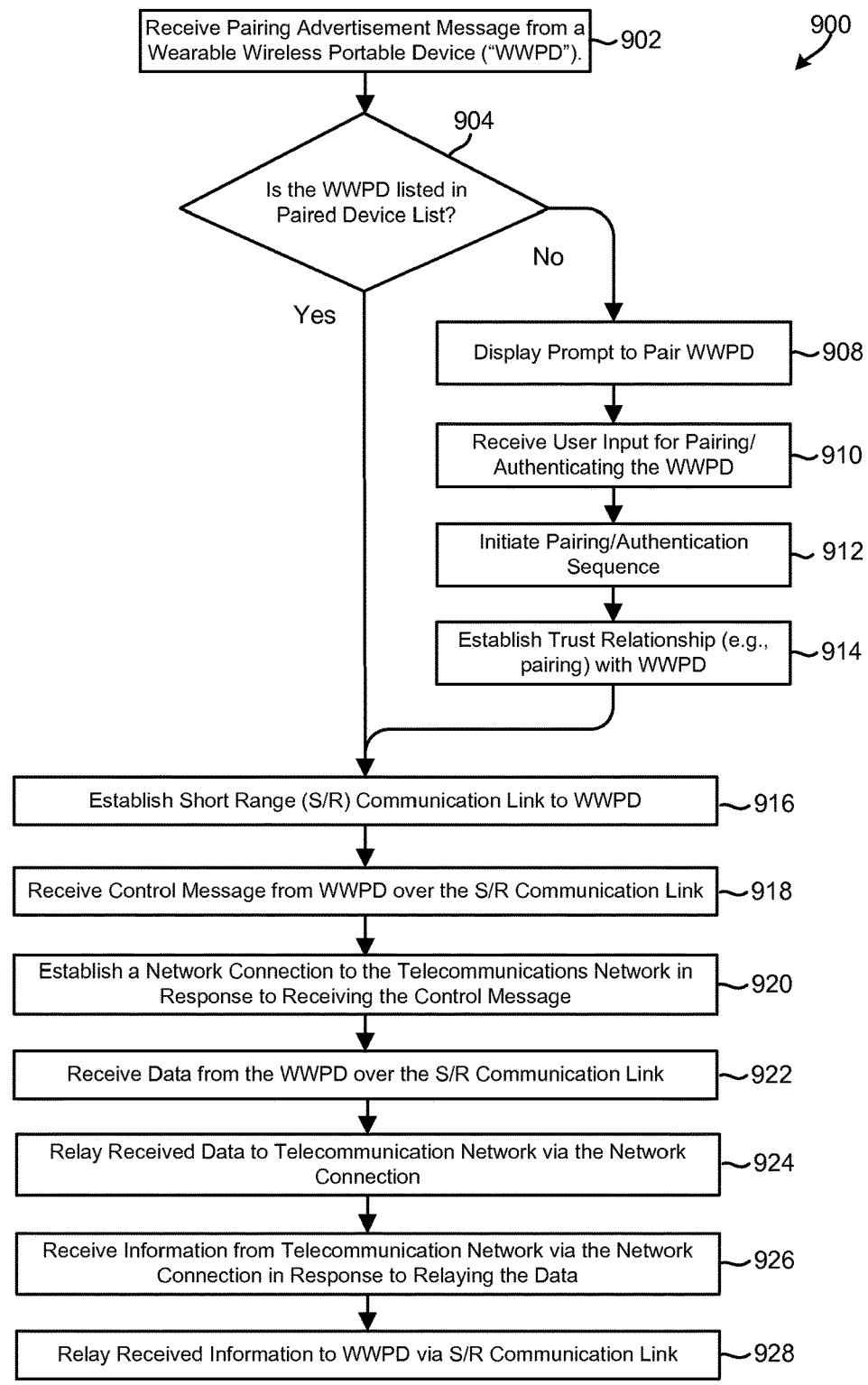
FIG. 9 is a process flow diagram of an embodiment method for selecting a communication path between a wearable wireless portable device and a telecommunication network.

FIG. 9 illustrates an embodiment mobile device method 900 of establishing a communication link with a wearable wireless portable device ("WWPD") 105. The mobile device method 900 may be performed in a processor of a wireless-enabled mobile device, such as a smartphone.

In block 902, a mobile device processor may receive a pairing advertisement message from a WWPD 105 indicating that the WWPD 105 is in pairing range of the mobile device. In determination block 904, the mobile device processor may determine whether the WWPD 105 is listed in a paired device list stored on a memory of the mobile device. If the mobile device processor determines that the WWPD 105 is listed in a paired device list (i.e., determination block 904="Yes"), in block 916, the mobile device processor may establish a low-power short range communication link with the WWPD 105. In an embodiment, this may be accomplished via a radio frequency (RF) circuitry implementing the Bluetooth® protocol stack/interface.

If the mobile device processor determines that the WWPD 105 is not listed in a paired device list (i.e., determination block 904="No"), in block 908, the mobile device processor may generate a display message on an electronic display of the mobile computing device prompting the user to input authentication information for pairing the WWPD 105. In block 910, the mobile device processor may receive user input selecting and/or authenticating the WWPD 105. In block 912, the mobile device processor may initiate the pairing sequence with the WWPD 105. In block 914, the mobile device processor and the WWPD 105 may establish a trust relationship (i.e., pairing) by exchanging pairing and authentication information.

In block 916, the mobile device processor may establish a low-power short range communication link with the WWPD 105. Also as part of block 916 (or block 914), the mobile device processor may store the pairing and authentication information in the paired device list (PDL) in association with the authenticated WWPD 105.

In block 918, the mobile device processor may receive a control message over the established low-power short range communication link instructing the mobile device to establish a connection to the telecommunications network. In block 920, the mobile device processor may establish a network connection to the telecommunications network in response to receiving the control message. For example, the mobile device processor may activate and/or use a cellular transceiver or WAN circuitry to establish the network connection. In this particular embodiment and in some other embodiments disclosed herein, it is contemplated that the mobile device processor establishes a network connection for the WWPD that is distinguishable from that normally established by the mobile device for connection of itself to the telecommunications network. This may prove useful for billing, etc. In other embodiments disclosed herein, it is assumed that the mobile device has already established a network connection and therefore no control message from the WWPD is necessary to establish a network connection for the mobile device.

In block 922, the mobile device processor may receive data from the WWPD 105 over the low-power short range communication link. In block 924, the mobile device processor may relay the received data to a server telecommunication network via the network connection. In block 926, the mobile device processor may receive information from the server in the telecommunication network via the network connection in response to relaying the data. In block 928, the mobile device processor may relay the received information to the WWPD 105.

Figure 10A:
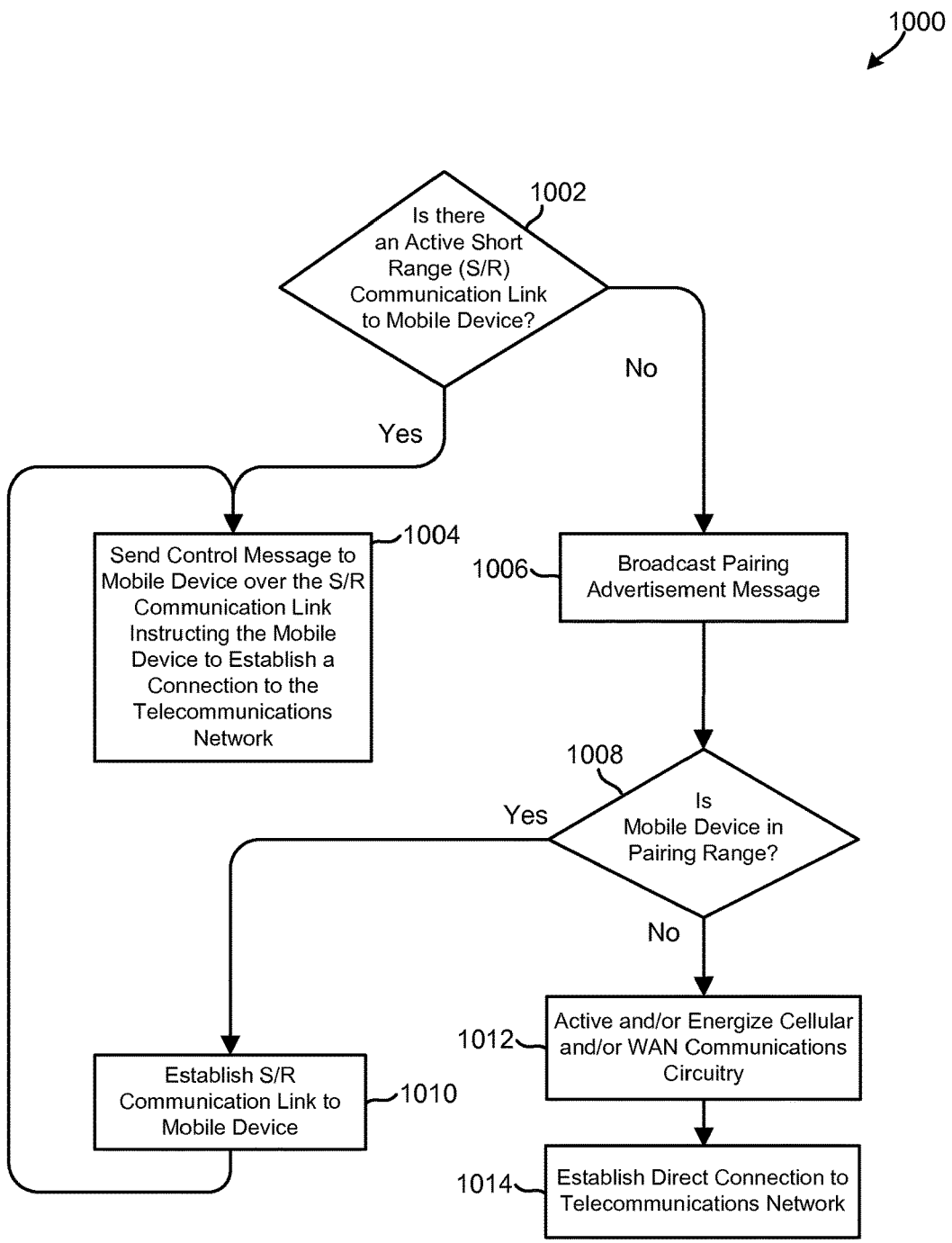
FIG. 10A is a process flow diagram of another embodiment method for selecting a communication path between a wearable wireless portable device and a telecommunication network.

FIG. 10A illustrates an embodiment WWPD method 1000 that may be implemented in a processor in a WWPD for establishing a connection to a telecommunications network. In determination block 1002, the WWPD processor may determine whether there is an active low-power short range communication link to a mobile device. If the WWPD processor determines that there is an active low-power short range communication link to a mobile device (i.e., determination block 1002="Yes"), in block 1004, the WWPD processor may send a control message to the mobile device over the active low-power short range communication link instructing the mobile device to establish a connection to the telecommunications network. When the WWPD processor determines that there are no active low-power short range communication links to the mobile device (i.e., determination block 1002="No"), in block 1006, the WWPD processor may broadcast a pairing advertisement message, which may be accomplished via an RF radio. In determination block 1008, the WWPD processor may determine whether the mobile device is in pairing range and/or whether a low-power short range communication link to the mobile device can be established by waiting for a response to the broadcasted pairing advertisement message.

If the WWPD processor determines that the mobile device is in pairing range and/or a low-power short range communication link can be established to the mobile device (i.e., determination block 1008="Yes"), in block 1010, the WWPD processor may establish a low-power short range communication link to the mobile device. In block 1004, the WWPD processor may send a control message to the mobile device over the active low-power short range communication link instructing the mobile device to establish a connection to the telecommunications network.

If the WWPD processor determines that mobile device is not in pairing range or that a low-power short range communication link cannot be established to the mobile device (i.e., determination block 1008="No"), in block 1012, the WWPD processor may activate or energize cellular and/or WAN communications circuitry. In block 1014, the WWPD 105 may establish a direct communications link to the telecommunication network via the activated/energized communications circuitry.

Figure 10B:
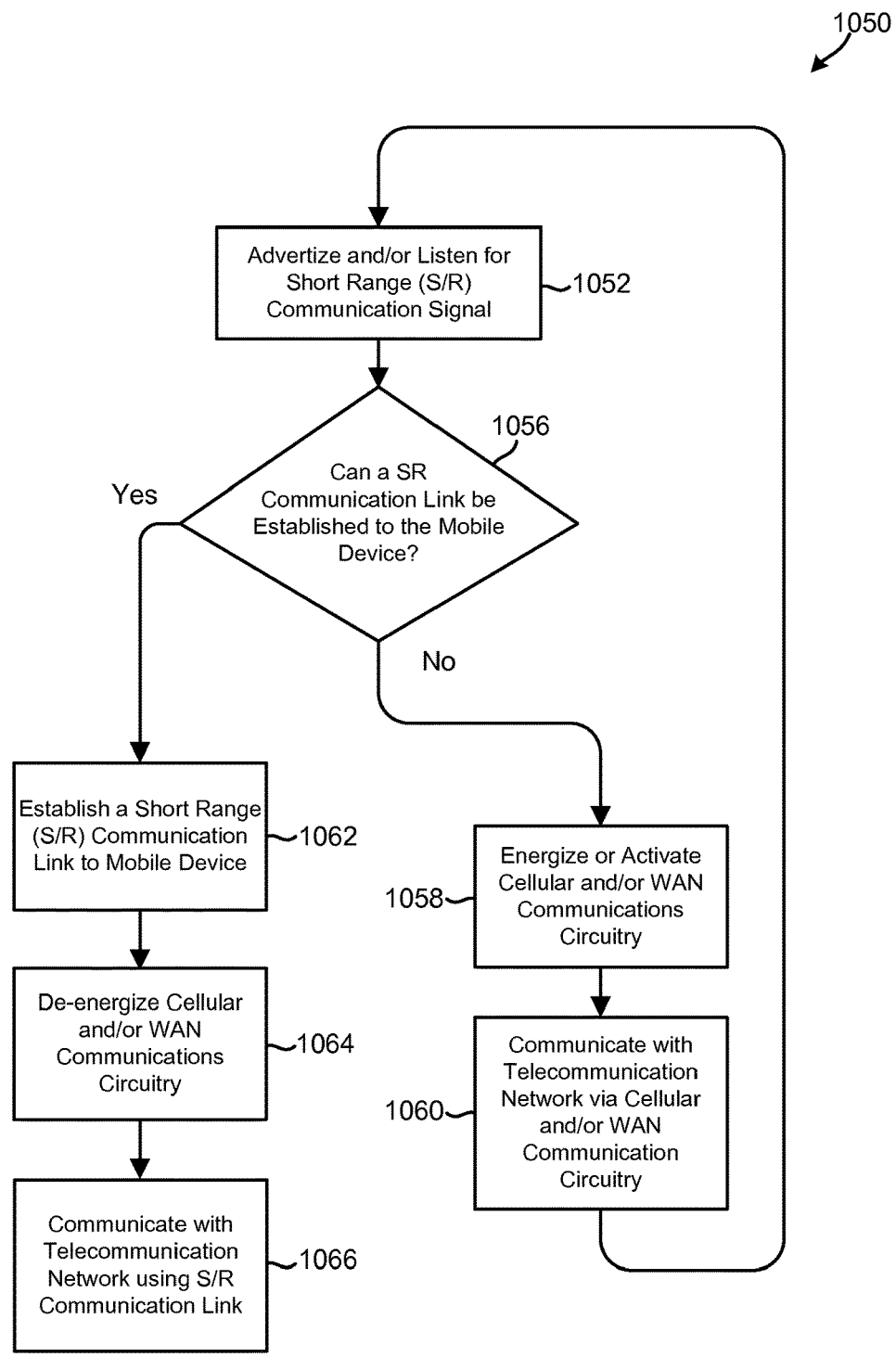
FIG. 10B is a process flow diagram of an embodiment wearable wireless portable device method of sending and receiving information to and from a telecommunication network.

FIG. 10B illustrates another embodiment method 1050 that may be implemented in a processor in a WWPD for establishing a connection to a telecommunications network. In block 1052, the WWPD processor may advertise and/or listen for a low-power short range communication signal. In determination block 1054, the WWPD processor may determine whether an active low-power short range communication link can be established to a mobile device.

If the WWPD processor determines that an active low-power short range communication link cannot be established to a mobile device (i.e., determination block 1054="No"), in block 1058, the WWPD processor may energize and/or activate cellular and/or WAN communication circuitry of the WWPD 105 to connect to a telecommunication network. In block 1060, the WWPD processor may send and receive information to and from the telecommunication network via the activated/energized cellular and/or WAN communication circuitry.

If the WWPD processor determines that an active low-power short range communication link can be established to a mobile device (i.e., determination block 1054="Yes"), in block 1062, the WWPD processor may establish a low-power short range communication link to the mobile device. In block 1064, the WWPD processor may de-energize the cellular and/or WAN communication radios and circuitry of the WWPD 105, if such circuits are then active/energized. In block 1066, the WWPD processor may send and receive information to and from the telecommunication network via the short range communication link using the communication circuitry of the mobile device (e.g., a smart phone 802).

In an embodiment, the WWPD 105 may be configured to automatically energize circuitry for establishing a direct connection to the telecommunications network when the low-power short range communication link 804 is terminated, such as when the WWPD 105 is moved beyond the communication range of the smart phone 802.

In an embodiment, the WWPD 105 may be configured to automatically de-energize the circuitry for establishing a direct connection to the telecommunications network when the low-power short range communication link 804 is re-established, such as when the WWPD 105 is moved back into communication range of the smart phone 802 (i.e., determination block 1054="Yes").

In an embodiment, the WWPD 105 may be configured to intelligently select wireless communication method to utilize and/or the types of communication links to establish for connecting to the telecommunications network. That is, because the WWPD 105 may include both circuitry for establishing a direct connection to the telecommunication network (e.g., via the cellular/WAN circuitry) and circuitry for establishing indirect connections to the telecommunication network (e.g., via Bluetooth® radio to a mobile device). In an embodiment, the WWPD 105 may be configured to intelligently determine which circuitry to activate, which types of communication links to establish, and/or which communication methods to utilize. The intelligent selection of the wireless communication method may include determining which communication method is the most energy efficient, provides the best quality of service, is most cost effective, etc.

Figure 10C:
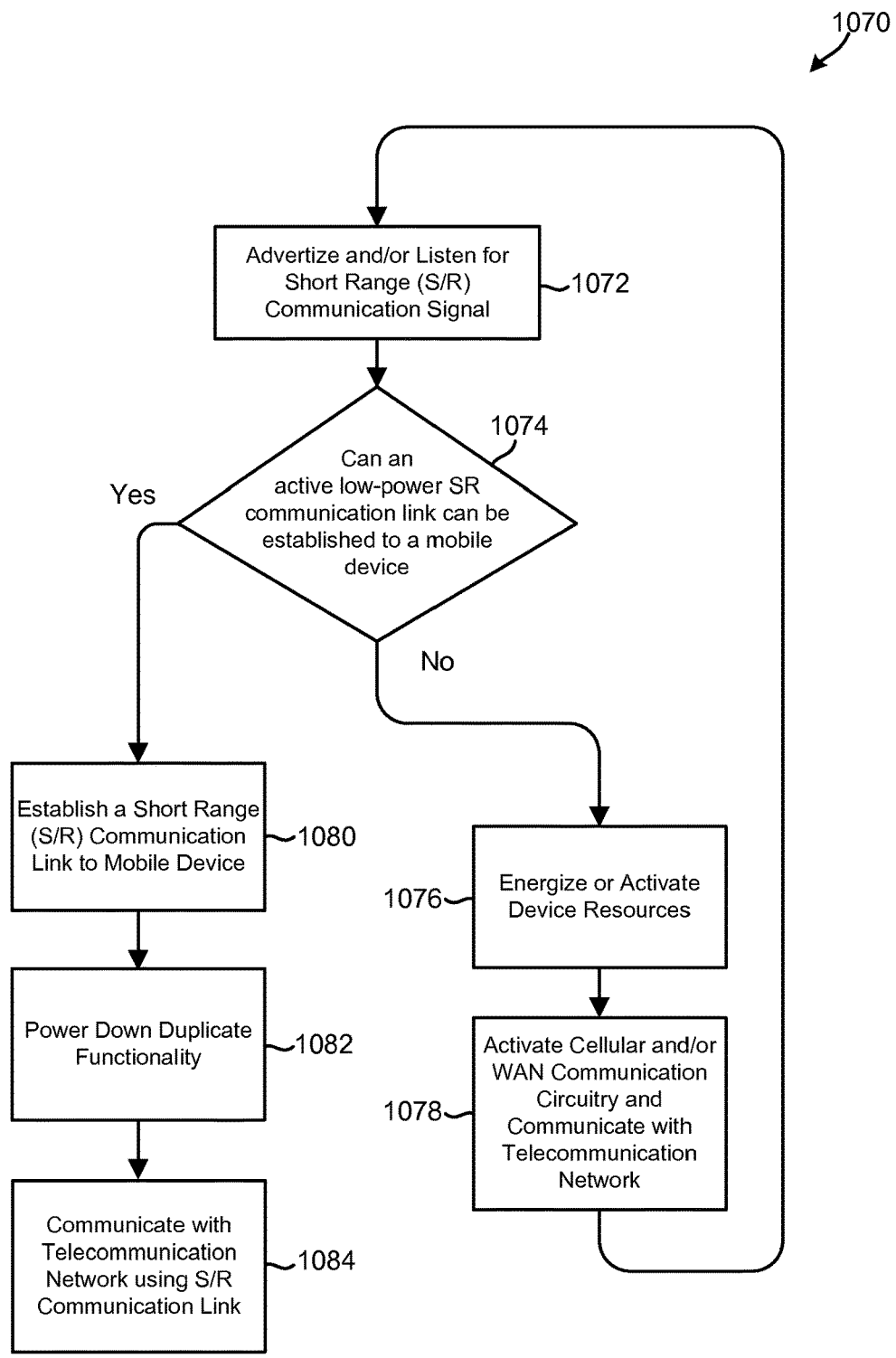
FIG. 10C is a process flow diagram of an embodiment method of de-energizing resources in the wearable wireless portable device when it is in close proximity to a mobile device.

FIG. 10C illustrates another embodiment method 1070 that may be implemented in a processor in a WWPD for establishing a connection to a telecommunications network. In block 1072, the WWPD processor may advertise and/or listen for a low-power short range communication signal from a mobile device. In determination block 1074, the WWPD processor may determine, based on responses to advertisements or received low-power short range signals, whether an active low-power short range communication link can be established to a mobile device.

If the WWPD processor determines that an active low-power short range communication link cannot be established to a mobile device (i.e., determination block 1074="No"), in block 1076, the WWPD processor may energize and/or activate various device resources, such as a GPS receiver, a communication bus, a processor, voltage rail, etc. In block 1078, the WWPD processor may activate cellular and/or WAN communication circuitry of the WWPD 105 to connect to a telecommunication network.

If the WWPD processor determines that an active low-power short range communication link can be established to a mobile device (i.e., determination block 1074="Yes"), in block 1080, the WWPD processor may establish a low-power short range communication link to the mobile device. In block 1082, the WWPD processor may selectively power down duplicate functionality of the communication device in response to determining that a wireless connection has been established to the second communication device. For example, the WWPD processor may de-energize various device resources, such as cellular and/or WAN communication radios and circuitry of the WWPD 105, a GPS receiver, a communication bus, a processor, voltage rail, etc. De-energizing such resources may be acceptable because the WWPD processor can use resources of the mobile device, such as the GPS receiver, WAN radios, and circuitry on the mobile device.

De-energizing such resources in block 1082 reduces the power consumption of the WWPD, thereby enabling its battery size to be reduced, particularly for wearable devices that are expected to be used in close proximity to a mobile device a majority of the time (e.g., a wrist watch device). In an embodiment, as part of block 1082, the WWPD processor may receive a communication message from the mobile device that includes information suitable for use in determining the duplicate functionalities (i.e., the functionalities of the WWPD that are or may be duplicated or performed by the mobile device) that may be powered down in response to establishing a wireless connection to the mobile device. In block 1084, the WWPD processor may send and receive information to and from the telecommunication network via the short range communication link using the WAN communication circuitry and resources of the mobile device (e.g., a smart phone 802).

Various embodiments may include a first device that is capable of mobile operation and operable to communicate information, wirelessly, directly to a wide area network (WAN) or indirectly, via a wireless connection to a second device capable of mobile operation and connected wirelessly to said WAN. The first device being may be further operable to selectively power-down/de-energize/deactivate duplicate functionality on said first device that is likewise found on said second device in connection with a wireless link being established between said first and second devices. The first device may also be operable to perform any of the methods discussed above. For example, the first device may be configured with processor executable instructions to perform operations for powering down duplicate position location functionality of the first device. In such embodiments, first and second devices may exchange information as part of or following a pairing routine regarding the capabilities and functionality of the second device that the first device can rely on. The first device may use such information to determine the duplicate functionality that can be selectively powered-down. Also, the first device may identify its currently powered functionality to the second device during or after the pairing process to enable the second device to identify to the first device functionality that it can be selectively powered-down.

Figure 11:
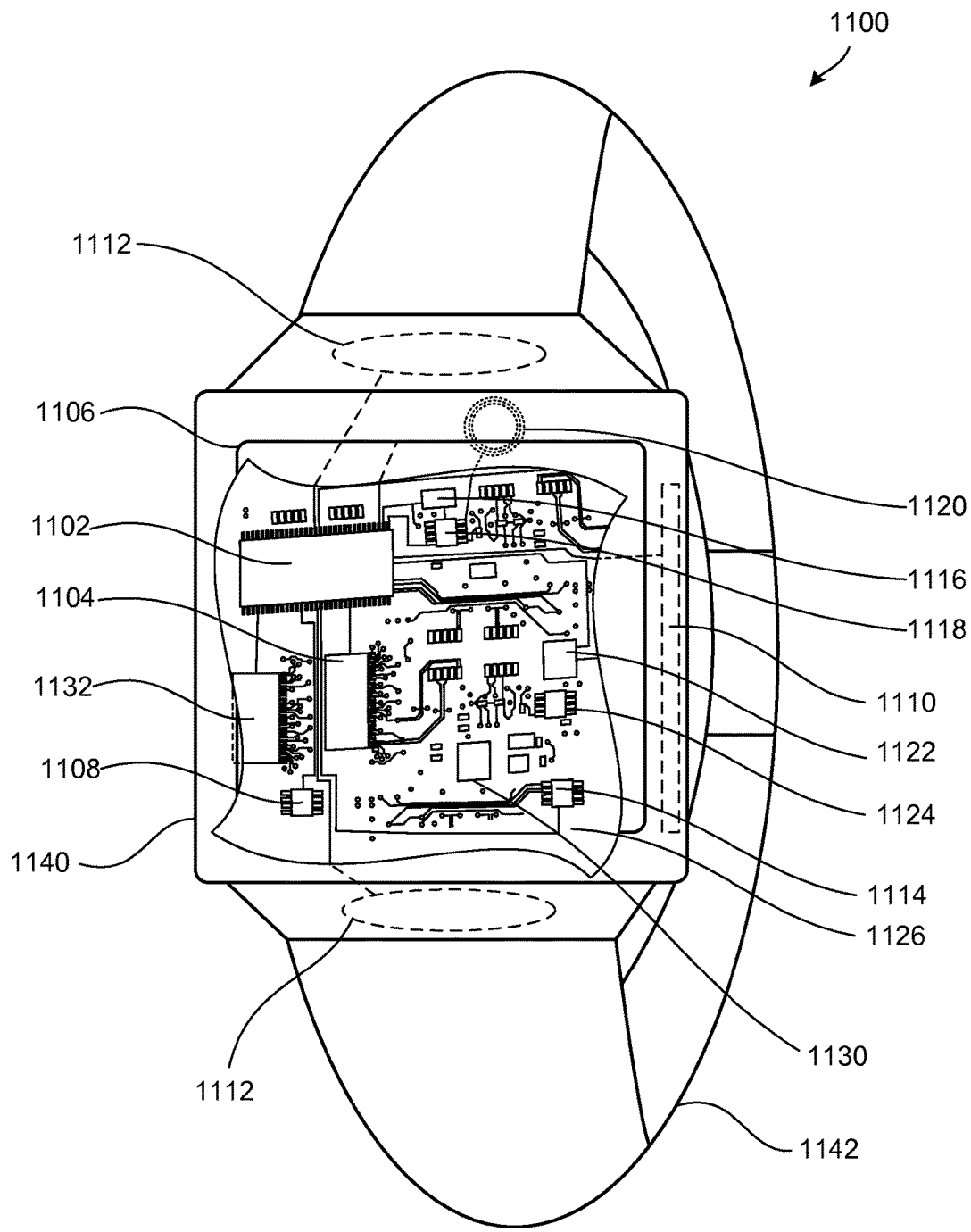
FIG. 11 is a circuit block diagram of a wearable wireless portable device suitable for use with the various embodiments.

FIG. 11 is a component block diagram illustrating an example wearable wireless portable device ("WWPD") 105 in the form of a wrist display 1100. A wrist display 1100 may include a processor 1102 coupled to a volatile and/or non-volatile internal memory 1104, which may be secure and/or encrypted memories, unsecure and/or unencrypted memories, or any combination thereof.

The processor 1102 may also be coupled to an electronic display screen 1106, which may be a touch screen display (e.g., resistive-sensing touch screen, capacitive-sensing touch screen, infrared sensing touch screen, etc.). The wrist display 1100 may include wide area network (WAN) communications circuitry, such as one or more transceivers 1114, such as a cellular telephone transceiver or LTE radio module, coupled to an antenna 1108 for sending and receiving electromagnetic radiation. The WAN transceiver 1114 and antenna 1108 may be used to communicate information over a cellular communications network. The wrist display 1100 also includes low-power short range communication circuitry 1114, such as a Bluetooth® transceiver 1113, coupled to the processor 1102. The low-power short range communication circuitry 1114 may be configured to communicate with a compatible transceiver in a mobile device using one or more of Bluetooth®, Wi-Fi, Peanut®, IEEE 802.15.4Zig-Bee® (i.e.,), ANT or other low power wireless communication protocol currently available or which may be developed in the future.

The wrist display 1100 may further include a slide sensor 1110 and physical buttons 1112 for receiving user inputs. The wrist display 1100 may also include a battery 1116 coupled to an inductive charging circuit 1118, and a coil antenna 1120 which may be an inductive coil adapted to enable inductive charging of the battery 1116. The battery 1116 and inductive charging circuit 1118 may be coupled to the processor 1102 to enable the wrist display 1100 to control inductive charging and generate messages via the coil antenna 1120. The wrist display 1100 may further include a vibratory motor 1122, and various sensors (e.g., gyroscopes, accelerometers, pedometers, thermometers, thermocouples, etc.) 1130, all of which may be coupled to the processor 1102.

The wrist display 1100 may include a global positioning system receiver 1130 that is coupled to the processor 1102 and which supports United States Global Positioning System (GPS) or other global navigation or satellite positioning systems, such as the Russian GLONASS system and the European Galileo System. The wrist display 1100 may also include a biological or physiological sensor 1132 configured to monitor one or more physiological parameters, such as heart rate, variability in heart rate, breathing rate, arrhythmia of the heart (if any), general rhythm and functioning of the heart, blood pressure, body movements (i.e., physical activity), steps taken (e.g., a pedometer), body position, body temperature, presence and quantity of sweat, oxygenation, etc. Such sensor(s) 1132 may be coupled to the processor 1102.

The electrical components of the wrist display 1100 may be integrated and coupled together using surface mount technologies in which components are mounted or placed directly onto the surface of a printed circuit board 1126, on a conventional circuit board 1126 with through-board connections, multi-chip modules, system on chips (SoC), or any other electrical component mounting, manufacturing, or electronics technology that is currently known or which may be developed in the future.

The electrical components of the wrist display 1100 may be integrated within a package encompassed by a bezel 1140 surrounding the electronic display screen 1106 that is coupled to a wrist band 1142 so that it can be worn by a user like an ordinary watch.

Figure 12:
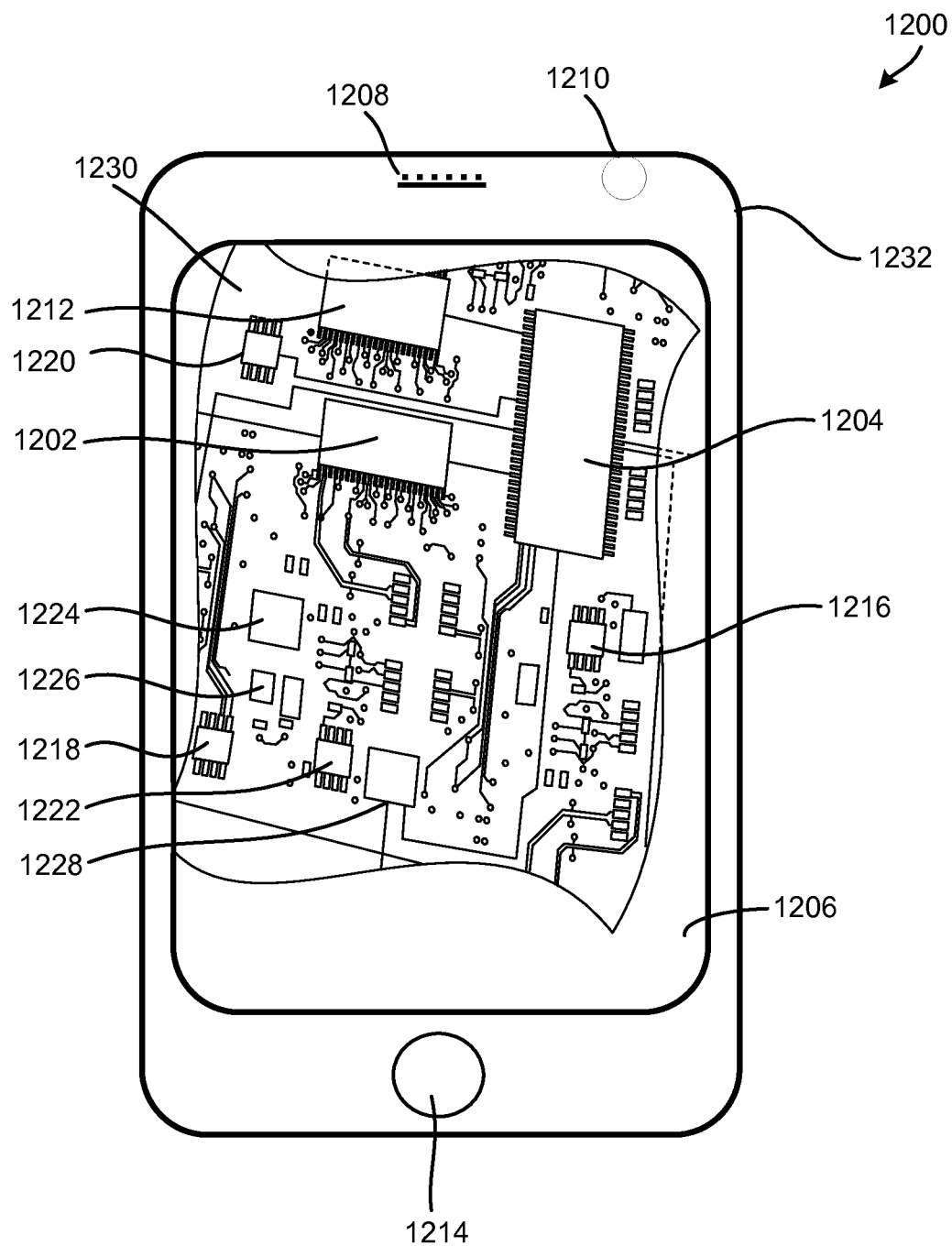
FIG. 12 is a circuit block diagram of a mobile device suitable for use with the various embodiments.

Various embodiments may be implemented on a variety of mobile devices, an example of which is illustrated in FIG. 12. Specifically, FIG. 12 is a system block diagram of a mobile transceiver device in the form of a feature-rich smartphone/cell phone 1200 suitable for use with any of the embodiments. The smartphone 1200 may include a processor 1202 coupled to internal memory 1204, a display 1206, and to a speaker 1208. Additionally, the smartphone 1200 may include one or more transceivers 1224, radios (e.g., RF radio) 1226 and/or antennas 1210 for sending and receiving electromagnetic radiation that may be connected to a wireless data link and coupled to the processor 1202. The radios 1226, transceivers 1224, and/or antennas 1210 may be used to communicate information over a cellular communications network and/or to implement the Wi-Fi/Bluetooth® protocol stacks or interfaces (e.g., the smartphone 1200 may be Wi-Fi and Bluetooth®-enabled, etc.). The transceivers 1224 may include, or may be coupled to, one or more built-in low power and/or cellular radio systems, including a cellular telephone transceiver, LTE radio module, Bluetooth radio, a Wi-Fi radio, a peanut radio, a ZigBee transceiver (i.e., an IEEE 802.15.4 transceiver), ANT or ANT radio, and/or other low power and/or cellular radio systems currently available or which may be developed in the future.

Smartphones 1200 typically also include menu selection buttons or rocker switches 1214 for receiving user inputs. The smartphone 1200 may also include a sound encoding/decoding (CODEC) circuit 1216 that digitizes sound received from a microphone into data packets suitable for wireless transmission and decodes received sound data packets to generate analog signals that are provided to the speaker 1208 to generate sound. Also, one or more of the processor 1202, wireless/cellular transceiver 1212 and CODEC 1216 may include a digital signal processor (DSP) circuit (not shown separately). The cell phone 1200 may further include a ZigBee transceiver (i.e., an IEEE 802.15.4 transceiver) 1218 and/or other similar communication circuitry (e.g., circuitry implementing the Bluetooth® or Wi-Fi protocols, etc.) for achieving low-power short-range wireless communications.

The smartphone 1200 may also include a positioning system receiver 1220 that supports the United States GPS or other GNSS or SPSs, such as the Russian GLONASS system and the European Galileo System. The cell phone 1200 may further include a battery 1228. The smartphone 1200 may also include various sensors 1222, including gyroscopes, accelerometers, pedometers, thermometers, thermocouples, and a biological or physiological monitor configured to monitor one or more physiological parameters.

The electrical components of the smartphone 1200 may be coupled together on one or more circuit boards 1230 using surface mount technologies, through-hole technologies, embedded technologies, multi-chip modules, system on chips, or any other mounting, manufacturing, or electronics technology that is currently known or will be developed in the future. The electrical components and circuit boards 1230 may be enclosed within a housing or case 1232.

The processors 1102, 1202 may be any programmable microprocessor, microcomputer or multiple processor chip or chips that can be configured by software instructions (applications) to perform a variety of functions, including the functions of the various embodiments described below. In some mobile devices, multiple processors 1202 may be provided, such as one processor dedicated to wireless communication functions and one processor dedicated to running other applications. Typically, software applications may be stored in the internal memory 1104, 1204, before they are accessed and loaded into the processor 1102, 1202. The processor 1102, 1202 may include internal memory sufficient to store the application software instructions.

While the various embodiments have been described above with reference to a wearable wireless portable device, the embodiments may also be implemented in a number of other types of communication device capable of mobile operation that include the structures and are configured to perform the operations described above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a software-configurable processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A software-configurable processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A first device capable of mobile operation, said first device being operable to communicate information, wirelessly, directly to a wide area network (WAN) or indirectly, via a wireless connection to a second device capable of mobile operation and connected wirelessly to said WAN,
    said first device being further operable to determine whether a low-power short range wireless link can be established to the second device and selectively power-down duplicate functionality including WAN communication functionality and at least one additional functionality on said first device likewise found on said second device in response to the low-power short range wireless link being established between said first and second devices,
    wherein the first device uses one or more resources of the second device to provide the powered-down duplicate functionality on the first device via the established low-power short range wireless link between the first and second devices, and
    wherein the first device activates the WAN communication functionality to communicate with the WAN in response to determining that the low-power short range wireless link between the first and second devices cannot be established.

2. The first device of claim 1, wherein the at least one additional functionality is selected from the group consisting of position location functionality, heart rate sensor functionality, blood pressure sensor functionality, gyroscope functionality, accelerometer functionality, pedometer functionality, thermometer functionality, glucometer functionality and a combination thereof.

3. The first device of claim 1 which further comprises powering-up the duplicate functionality on said first device in connection with a low-power short range wireless link not being established between said first device and said second device.

4. The first device of claim 1 wherein said low-power short range wireless link is a Wi-Fi link.

5. The first device of claim 1 wherein said low-power short range wireless link is a Bluetooth® link.

6. A method of communicating information between a wearable wireless portable device and a telecommunication network through a mobile device, comprising:
    determining whether a low-power short range communication link can be established to the mobile device;
    establishing a low-power short range communication link to the mobile device in response to determining that the low-power short range communication link can be established;
    in response to establishing the low-power short range communication link with a mobile device, de-energizing wide area network (WAN) communications circuitry and at least one additional duplicate functionality in the wearable wireless portable device and communicating bi-directionally with the telecommunication network through the mobile device via the low-power short range communication link;
    providing the de-energized at least one additional duplicate functionality using one or more resources of the mobile device via the low-power short range communication link; and
    activating WAN communications circuitry in the wearable wireless portable device and communicating with the telecommunication network via the activated WAN communications circuitry when a low-power short range communication link cannot be established between the mobile device and the wearable wireless portable device.

7. The method as recited in claim 6, wherein determining whether a low-power short range communication link is performed by a processor of the wearable wireless portable device.

8. The method of claim 6, wherein communicating bi-directionally with the telecommunication network via the low-power short range communication link comprises:
    generating in the wearable wireless portable device a control message configured to cause the mobile device to establish a network connection to the telecommunication network;
    sending the control message to the mobile device over the low-power short range communication link;

receiving in the wearable wireless portable device a response message indicating that the mobile device has established the network connection to the telecommunication network;

communicating with the mobile device over the low-power short range communication link; and receiving, in the wearable wireless portable device, content sent from the telecommunication network to the mobile device over the network connection, the content being received in the wearable wireless portable device via the low-power short range communication link.

9. The method of claim 8, wherein:

sending the control message to the mobile device over the low-power short range communication link comprises sending a control message configured to cause the mobile device to establish the network connection to the telecommunication network; and transmitting data to the mobile device over the low-power short range communication link and receiving content sent from the telecommunication network to the mobile device over the network connection comprises the wearable wireless portable device accessing the telecommunication network via the network connection of the mobile device by transmitting and receiving data via the low-power short range communication link.

10. The method of claim 8, wherein:

determining whether the low-power short range communication link can be established to the mobile device comprises determining whether the wearable wireless portable device is within communication range of the mobile device; and activating WAN communications circuitry in the wearable wireless portable device and communicating with the telecommunication network via the activated WAN communications circuitry when a low-power short range communication link cannot be established between the mobile device and the wearable wireless portable device comprises activating the WAN communications circuitry when the wearable wireless portable device determines that the wearable wireless portable device is not within communication range of the mobile device.

11. The method of claim 8, further comprising controlling one or more features of the mobile device by the wearable wireless portable device over the low-power short range communication link.

12. The method of claim 8, further comprising:

receiving in the wearable wireless portable device an incoming communication of the mobile device via the low-power short range communication link; and generating in the wearable wireless portable device a user notification to inform a user of the incoming communication.

13. The method of claim 12, wherein generating the user notification comprises displaying a message on an electronic display of the wearable wireless portable device.

14. The method of claim 12, wherein generating the user notification comprises outputting an audible sound or a vibration from the wearable wireless portable device.

15. The method of claim 12, further comprising registering with a server configured to route communications to and from the mobile device, wherein:

sending the control message to the mobile device over the low-power short range communication link comprises sending the control message to the server; and receiving the response message indicating that the mobile device has established the network connection to the telecommunication network comprise receiving the response message from the server.

16. The method of claim 6, wherein determining whether the low-power short range communication link can be established to the mobile device comprises determining whether the low-power short range communication link can be established in a processor that is included in one of:

a wrist display;
a bracelet;
a belt buckle;
a medallion;
a pendent;
a pen; and
a key chain.

17. The method of claim 6, further comprising de-energizing a resource in response to establishing the low-power short range communication link to the mobile device.

18. The method of claim 17, wherein de-energizing the resource comprising de-energizing a global positioning system receiver in response to establishing the low-power short range communication link to the mobile device.

19. A wearable wireless portable device, comprising:

means for determining whether a low-power short range communication link can be established to a mobile device;

means for establishing the low-power short range communication link to the mobile device in response to determining that the low-power short range communication link can be established;

means for de-energizing wide area network (WAN) communications circuitry and at least one additional duplicate functionality of the wearable wireless portable device and communicating bi-directionally with a telecommunication network via the low-power short range communication link in response to establishing the low-power short range communication link to the mobile device;

means for providing the de-energized at least one additional duplicate functionality using one or more resources of the mobile device via the low-power short range communication link; and means for activating WAN communications circuitry and communicating with the telecommunication network via the activated WAN communications circuitry in response to determining that the low-power short range communication link cannot be established.

20. The wearable wireless portable device of claim 19, wherein means for communicating bi-directionally with the telecommunication network via the low-power short range communication link comprises:

means for generating a control message configured to cause the mobile device to establish a network connection to the telecommunication network;

means for sending the control message to the mobile device over the low-power short range communication link;

means for receiving a response message indicating that the mobile device has established the network connection to the telecommunication network;

means for transmitting data to the mobile device over the low-power short range communication link; and means for receiving information that includes content sent from the telecommunication network to the mobile device over the network connection.

21. The wearable wireless portable device of claim 20, wherein:

means for sending the control message to the mobile device over the low-power short range communication link comprises means for sending a control message configured to cause the mobile device to establish the network connection to the telecommunication network; and means for transmitting data to the mobile device over the low-power short range communication link and means for receiving content sent from the telecommunication network to the mobile device over the network connection comprise means for accessing the telecommunication network via the network connection of the mobile device by transmitting and receiving data via the low-power short range communication link.

22. The wearable wireless portable device of claim 20, wherein:

means for determining whether the low-power short range communication link can be established to the mobile device comprises means for determining whether the mobile device is within communication range; and means for activating WAN communications circuitry in response to determining that the low-power short range communication link cannot be established comprises means for activating the WAN communications circuitry in response to determining that the mobile device is not within communication range.

23. The wearable wireless portable device of claim 20, further comprising means for controlling one or more features of the mobile device over the low-power short range communication link.

24. The wearable wireless portable device of claim 20, further comprising:

means for receiving an incoming communication of the mobile device via the low-power short range communication link; and means for generating a user notification to inform a user of the incoming communication.

25. The wearable wireless portable device of claim 24, wherein means for generating the user notification comprises means for displaying a message on an electronic display of the wearable wireless portable device.

26. The wearable wireless portable device of claim 24, wherein means for generating the user notification comprises means for outputting an audible sound or a vibration.

27. The wearable wireless portable device of claim 20, further comprising means for registering with a server configured to route communications to and from the mobile device, and wherein:

means for sending the control message to the mobile device over the low-power short range communication link comprises means for sending the control message to the server; and means for receiving the response message indicating that the mobile device has established the network connection to the telecommunication network comprise means for receiving the response message from the server.

28. The wearable wireless portable device of claim 19, comprises one of:
a wrist display;
a bracelet;
a belt buckle;
a medallion;
a pendent;
a pen; and
a key chain.

29. The wearable wireless portable device of claim 19, further comprising means for de-energizing a resource of the wearable wireless portable device in response to establishing the low-power short range communication link to the mobile device.

30. The wearable wireless portable device of claim 29, wherein means for de-energizing a resource of the wearable wireless portable device comprising means for de-energizing a global positioning system receiver in response to establishing the low-power short range communication link to the mobile device.

31. A wearable wireless portable device, comprising:
wide area network (WAN) communications circuitry;
low-power short range communication circuitry; and
a processor coupled to the WAN communications circuitry and the low-power short range communication circuitry, wherein the processor is configured with processor-executable instructions to perform operations comprising:

determining whether a low-power short range communication link can be established to a mobile device;

establishing the low-power short range communication link to the mobile device via the low-power short range communication circuitry in response to determining that the low-power short range communication link can be established;

de-energizing the wide area network (WAN) communications circuitry and at least one additional duplicate functionality and communicating bi-directionally with a telecommunication network via the low-power short range communication link;

providing the de-energized at least one additional duplicate functionality using one or more resources of the mobile device via the low-power short range communication link; and activating the WAN communications circuitry and communicating with the telecommunication network via the activated WAN communications circuitry in response to determining that the low-power short range communication link cannot be established to the mobile device.

32. The wearable wireless portable device of claim 31, wherein the processor is configured with processor-executable instructions to perform operations such that communicating bi-directionally with the telecommunication network via the low-power short range communication link comprises:

generating a control message configured to cause the mobile device to establish a network connection to the telecommunication network;

sending the control message to the mobile device over the low-power short range communication link;

receiving a response message indicating that the mobile device has established the network connection to the telecommunication network;

transmitting data to the mobile device over the low-power short range communication link; and receiving content sent from the telecommunication network to the mobile device over the network connection via the low-power short range communication link.

33. The wearable wireless portable device of claim 32, wherein the processor is configured with processor-executable instructions to perform operations such that:

sending the control message to the mobile device over the low-power short range communication link comprises sending a control message configured to cause the mobile device to establish the network connection to the telecommunication network; and transmitting data to the mobile device over the low-power short range communication link and receiving the content sent from the telecommunication network to the mobile device over the network connection comprises accessing the telecommunication network via the network connection of the mobile device by transmitting and receiving data via the low-power short range communication link.

34. The wearable wireless portable device of claim 32, wherein the processor is configured with processor-executable instructions to perform operations such that:
   determining whether the low-power short range communication link can be established to the mobile device comprises determining whether the mobile device is within communication range; and
   activating the WAN communications circuitry in response to determining that the low-power short range communication link cannot be established comprises activating the WAN communications circuitry in response to determining that the mobile device is not within communication range.

35. The wearable wireless portable device of claim 32, wherein the processor is configured with processor-executable instructions to perform operations further comprising controlling one or more features of the mobile device over the low-power short range communication link.

36. The wearable wireless portable device of claim 32, wherein the processor is configured with processor-executable instructions to perform operations further comprising:
   receiving an incoming communication for the mobile device via the low-power short range communication link; and
   generating in the wearable wireless portable device a user notification to inform a user of the incoming communication.

37. The wearable wireless portable device of claim 36, wherein the processor is configured with processor-executable instructions to perform operations such that generating the user notification comprises displaying a message on an electronic display of the wearable wireless portable device.

38. The wearable wireless portable device of claim 36, wherein the processor is configured with processor-executable instructions to perform operations such that generating the user notification comprises outputting an audible sound or a vibration.

39. The wearable wireless portable device of claim 32, wherein the processor is configured with processor-executable instructions to perform operations further comprising registering with a server configured to route communications to and from the mobile device, and wherein the processor is configured with processor-executable instructions to perform operations such that:
   sending the control message to the mobile device over the low-power short range communication link comprises sending the control message to the server; and
   receiving the response message indicating that the mobile device has established the network connection to the telecommunication network comprises receiving the response message from the server.

40. The wearable wireless portable device of claim 31, wherein the wearable wireless portable device comprises one of:
   a wrist display;
   a bracelet;
   a belt buckle;
   a medallion;
   a pendent;
   a pen; and
   a key chain.

41. The wearable wireless portable device of claim 31, wherein the processor is configured with processor-executable instructions to perform operations further comprising de-energizing a resource of the wearable wireless portable device in response to establishing the low-power short range communication link to the mobile device.

42. The wearable wireless portable device of claim 41, wherein the processor is configured with processor-executable instructions to perform operations such that de-energizing the resource of the wearable wireless portable device comprises de-energizing a global positioning system receiver in response to establishing the low-power short range communication link to the mobile device.

43. A communication device capable of mobile operation, comprising:
   a first transceiver suitable for communicating information, wirelessly, directly to a wide area network (WAN);
   a second transceiver suitable for communicating information indirectly to the WAN via a wireless connection to a second communication device capable of mobile operation and connected wirelessly to the WAN; and
   a processor coupled to the first and second transceivers, wherein the processor is configured with processor-executable instructions to perform operations comprising:
      determining whether a low-power short range wireless connection can be established to the second communication device;
      selectively powering down duplicate functionality including the first transceiver and at least one additional functionality of the communication device in response to determining that the low-power short range wireless connection has been established to the second communication device;
      using one or more resources of the second communication device to provide the powered-down duplicate functionality on the first device via the established low-power short range wireless connection; and
      activating the first transceiver in response to determining that the low-power short range wireless connection cannot be established.

44. The communication device of claim 43, wherein the processor is configured with processor-executable instructions to perform operations such that selectively powering down at least one additional functionality of the communication device comprises powering down a position location functionality of the communication device.

45. The communication device of claim 44, wherein the processor is configured with processor-executable instructions to perform operations such that powering down the position location functionality of the communication device comprises powering down a global positioning system receiver of the communication device.

46. The communication device of claim 43, wherein the processor is configured with processor-executable instructions to perform operations such that selectively powering down at least one additional functionality of the communication device comprises powering down one or more of:
   a heart rate sensor;
   a blood pressure sensor;
   a gyroscope;
   an accelerometer;
   a pedometer;
   a thermometer; and
   a glucometer.

47. The communication device of claim 43, wherein the processor is configured with processor-executable instructions to perform operations such that selectively powering down duplicate functionality including the first transceiver and at least one additional functionality of the communication device in response to determining that the low-power short range wireless connection has been established to the second communication device comprises:

powering down duplicate functionality in response to determining that a low-power short range communication link has been established to the second communication device.

48. A communication device capable of mobile operation, comprising:

means for wirelessly communicating information directly to a wide area network (WAN);

means for communicating information indirectly to the WAN via a wireless connection to a second communication device capable of mobile operation and connected wirelessly to the WAN;

means for determining whether a low-power short range wireless connection can be established to the second communication device;

means for selectively powering down duplicate functionality including the means for wirelessly communicating information directly to the WAN and at least one additional functionality of the communication device in response to determining that the low-power short range wireless connection has been established to the second communication device;

means for using one or more resources of the second communication device to provide the powered-down duplicate functionality on the first device via the established low-power short range wireless connection; and means for activating the means for wirelessly communicating information directly to the WAN in response to determining that the low-power short range wireless connection cannot be established.

49. The communication device of claim 48, wherein means for selectively powering down at least one additional functionality of the communication device comprises means for powering down a position location functionality of the communication device.

50. The communication device of claim 49, wherein means for selectively powering down the position location functionality of the communication device comprises means for powering down a global positioning system receiver of the communication device.

51. The communication device of claim 48, wherein means for selectively powering down at least one additional functionality of the communication device comprises means for powering down one or more of:

a heart rate sensor;

a blood pressure sensor;

a gyroscope;

an accelerometer;

a pedometer;

a thermometer; and a glucometer.

52. The communication device of claim 48, wherein means for selectively powering down duplicate functionality in response to determining that the low-power short range wireless connection has been established to the second communication device comprises:

means for selectively powering down duplicate functionality in response to determining that a low-power short range communication link has been established to the second communication device.

\* \* \* \* \*